(12) United States Patent
Drazic et al.

(10) Patent No.: US 12,742,968 B2
(45) Date of Patent: Sep. 22, 2026

(54) UNIFORM INCOUPLER FOR CONICAL INCIDENCE

(71) Applicant: INTERDIGITAL MADISON PATENT HOLDINGS, SAS, Paris (FR)

(72) Inventors: Valter Drazic, Betton (FR); Oksana Shramkova, Liffré (FR); Bobin Varghese, Munich (DE); Valerie Allie, Saint-Armel (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 399 days.

(21) Appl. No.: 18/272,991

(22) PCT Filed: Jan. 20, 2022

(86) PCT No.: PCT/EP2022/051199
§ 371 (c)(1),
(2) Date: Jul. 18, 2023

(87) PCT Pub. No.: WO2022/157228
PCT Pub. Date: Jul. 28, 2022

(65) Prior Publication Data

US 2024/0094537 A1 Mar. 21, 2024

(30) Foreign Application Priority Data

Jan. 21, 2021 (EP) .................................... 21305073

(51) Int. Cl.

| | |
|---|---|
| ***G02B 27/01*** | (2006.01) |
| ***F21V 8/00*** | (2006.01) |
| ***G02B 27/00*** | (2006.01) |

(52) U.S. Cl.
CPC ....... *G02B 27/0172* (2013.01); *G02B 6/0026* (2013.01); *G02B 27/0081* (2013.01)

(58) Field of Classification Search
CPC .............. G02B 27/0172; G02B 6/0026; G02B 27/0081; G02B 1/115; G02B 2027/0123; G02B 2027/0125
See application file for complete search history.

(56) References Cited

U.S. PATENT DOCUMENTS 7,903,338 B1 * 3/2011 Wach .................. A61B 5/0084 359/588
2016/0231568 A1 8/2016 Saarikko et al.
(Continued)

FOREIGN PATENT DOCUMENTS

CN 111722317 A 9/2020
EP 3671293 6/2020
(Continued)

*Primary Examiner* — Collin X Beatty
(74) *Attorney, Agent, or Firm* — Chris Kolefas

(57) ABSTRACT

In example embodiments, a waveguide display apparatus includes a waveguide comprising a substrate, a plurality of diffractive grating elements on the waveguide, and at least two coating layers on the waveguide between the substrate and the diffractive grating elements. The grating elements may be elements of a diffractive in-coupler. Some embodiments include three coating layers, with a middle layer having a refractive index greater than that of the substrate, the middle layer being between two layers having a refractive index lower than that of the substrate. Some embodiments further include a fourth coating layer.

16 Claims, 23 Drawing Sheets

(56) References Cited

U.S. PATENT DOCUMENTS

| | | | | |
|---|---|---|---|---|
| 2019/0056591 | A1* | 2/2019 | Tervo .................. | G02B 6/0038 |
| 2019/0179057 | A1 | 6/2019 | Peroz et al. | |

FOREIGN PATENT DOCUMENTS

| | | |
|---|---|---|
| WO | 2017180403 | 10/2017 |
| WO | 2021233877 | 11/2021 |
| WO | 2022002990 | 1/2022 |

* cited by examiner $\theta_i^g$ $\theta_i^c$ $\theta_d^g$ $\theta_d^c$

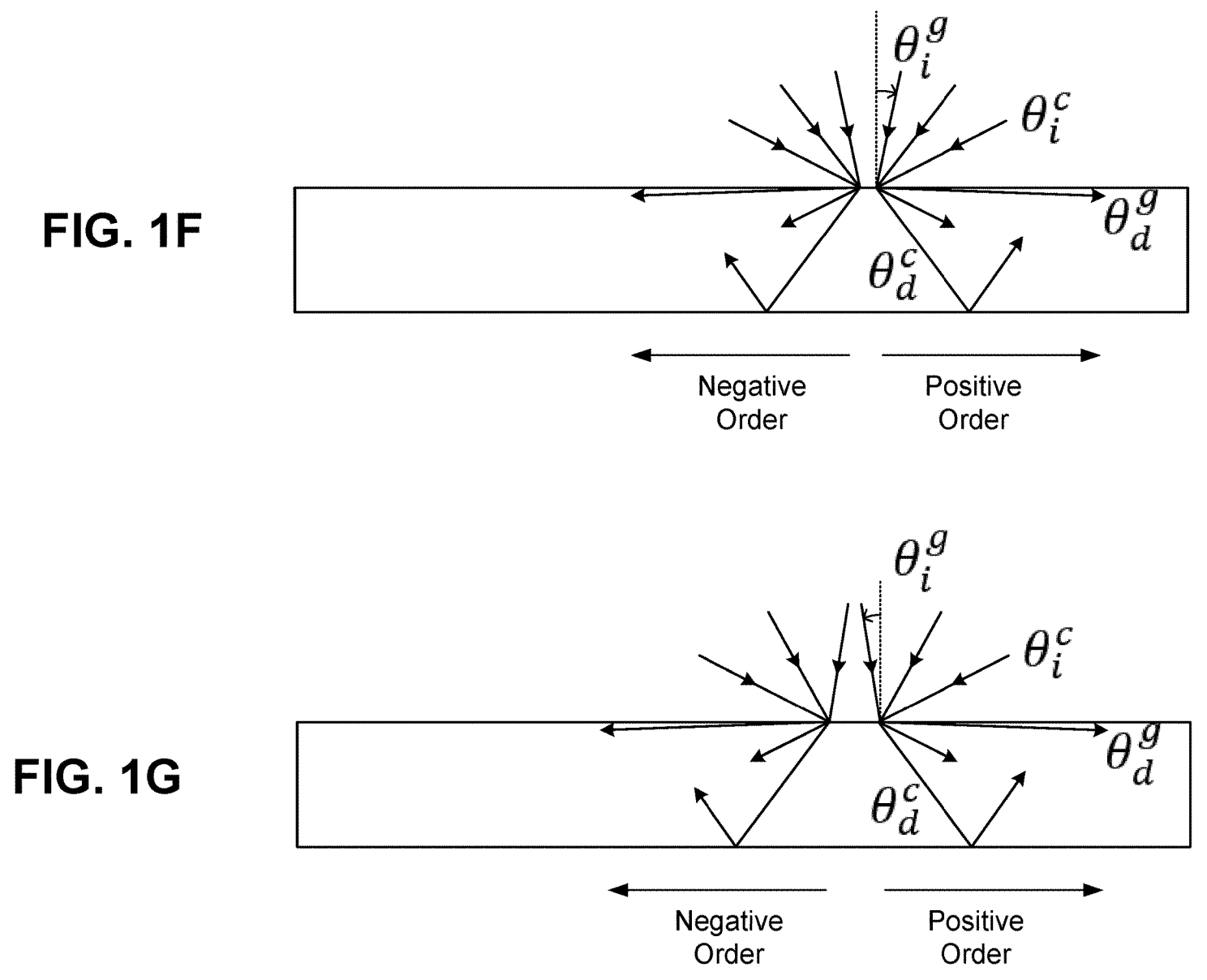

Positive Order

Negative Order

FIG. 1F $\theta_i^g$ $\theta_i^c$ $\theta_d^g$ $\theta_d^c$

Positive Order

Negative Order

FIG. 1G

Transmittance 0.8 0.7 0.6 0.5 0.4 0.3 0.2 0.1 0.0

$T_{-2}$ $T_{+2}$

16 -2.74 0 2.74 16

Angle of incidence (degrees)

FIG. 10

UNIFORM INCOUPLER FOR CONICAL INCIDENCE

CROSS-REFERENCE TO RELATED APPLICATION

This application is a national stage application under 35 U.S.C. § 371 of International Application No. PCT/EP2022/051199, entitled "UNIFORM INCOUPLER FOR CONICAL INCIDENCE." filed on Jan. 20, 2022, which claims priority of European Patent Application No. EP21305073, filed 21 Jan. 2021, which are incorporated herein by reference in their entirety.

BACKGROUND

The present disclosure relates to the field of optics and photonics, and more specifically to planar optical devices. More particularly, but not exclusively, the present disclosure relates to diffraction gratings that can be used in a wide range of devices, such as, among other examples, displays, including in- and out-coupling of light in waveguides for eyewear electronic devices and head-mounted displays for AR (Augmented Reality) and VR (Virtual Reality) glasses, head up displays (HUD), as for example in the automotive industry, optical sensors for photo/video/lightfield cameras, bio/chemical sensors, including lab-on-chip sensors, microscopy, spectroscopy and metrology systems, and solar panels.

This section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, it should be understood that these statements are to be read in this light and not as admissions of prior art.

AR/VR glasses are under consideration for a new generation of human-machine interface. Development of AR/VR glasses (and more generally eyewear electronic devices) is associated with a number of challenges, including reduction of size and weight of such devices as well as improvement of the image quality (in terms of contrast, field of view, color depth, etc.) that should be realistic enough to enable a truly immersive user experience.

The tradeoff between the image quality and physical size of the optical components motivates research into ultra-compact optical components that can be used as building blocks for more complex optical systems, such as AR/VR glasses. It is desirable for such optical components to be easy to fabricate and replicate. In such AR/VR glasses, various types of refractive and diffractive lenses and beam-forming components are used to guide the light from a micro-display or a projector towards the human eye, allowing forming a virtual image that is superimposed with an image of the physical world seen with a naked eye (in case of AR glasses) or captured by a camera (in case of VR glasses).

Some of kinds of AR/VR glasses use an optical waveguide wherein light propagates into the optical waveguide by TIR (for Total Internal Reflection) only over a limited range of internal angles. The FoV (for Field of View) of the waveguide depends on the material of the waveguide, among other factors.

In WO2017180403, a waveguide with extended field of view is proposed wherein a dual mode image propagation is used. In this method, the diffraction mode +1 is used to carry the right hand side image (negative angles of incidence on the in-coupler) in one direction and the −1 mode is used to propagate the positive angles of incidence into the opposite direction into the waveguide. Combining both half images is done thanks to the pupil expanders and out-couplers at the exit of the waveguide so that the user sees one single image. The goal of the system is to double the field of view since each half image can use the whole angular bandwidth of the waveguide in each direction of propagation.

Some optical waveguides include one or more diffraction gratings. The diffracting structure's period d (also known as grating pitch) may be selected based on the wavelength $\lambda$ of the incident light and on the refractive index $n_d$ of the material of the waveguide. For example, it may be desirable to select the grating pitch d to be twice the wavelength of the light in the waveguide medium, as follows:

$$d = \frac{2\times\lambda}{n_d + 1} \quad \text{(Eq. 1)}$$

If we consider the ratio between the grating's pitch and the wavelength: $d/\lambda$, in the case of equation 1 presented above, we can put that $3/2<n_d<2$ and $2/3<d/\lambda<4/5$ and in any case $d/\lambda<1$ a value that can be qualified as being sub-wavelength. Equation 1 in any case implies that the diffraction grating has a sub-wavelength structure.

In US20160231568, a waveguide for a wearable display is disclosed wherein the grating's pitch of the structure is between 250 and 500 nm.

Very small-pitch gratings can be difficult to fabricate. Gratings with sufficiently small pitch are out of reach of photo lithographic techniques when the structure is sub-wavelength, and the desired precision challenges even electron-beam lithography technology.

An overview of the available concepts for the design of optical waveguides reveals the lack of a reliable solution capable of providing intensive response for both polarizations (transverse electric, TE, and transverse magnetic, TM) simultaneously. It is thus desirable to provide diffraction gratings for use with optical waveguides or in other optical components. It is further desirable for such diffraction gratings to be operable with a micro display or other illumination source that uses unpolarized and/or incoherent light, such as a digital light processor, DLP, a display based on organic light-emitting diodes, OLEDs, or a display using unpolarized laser beams.

SUMMARY

References in the specification to "one embodiment," "an embodiment," "an example embodiment," and the like indicate that the embodiment described may include a particular feature, structure, or characteristic; but not every embodiment necessarily includes that particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described.

An apparatus according to some embodiments includes a waveguide comprising a substrate, a plurality of diffractive grating elements on the waveguide, and at least two transparent coating layers on the waveguide between the substrate and the diffractive grating elements. In some embodiments, at least one of the coating layers has a thickness of at least 40 nm.

In some embodiments, the coating layers include a first coating layer, a second coating layer, and a third coating layer, the third coating layer being in contact with the substrate, and the second coating layer being between the first coating layer and the third coating layer.

In some embodiments, the substrate has a substrate refractive index, the first coating layer has a first refractive index lower than the substrate refractive index, the second coating layer has a second refractive index higher than the substrate refractive index, and the third coating layer has a third refractive index lower than the substrate refractive index. In some embodiments, the first refractive index and the third refractive index are the same.

Some embodiments further include a fourth coating layer, wherein the fourth coating layer has a fourth refractive index greater than the second refractive index. The fourth coating layer may be, for example, between the first coating layer and the diffractive grating elements or between the first coating layer and the second coating layer.

In some embodiment, the fourth coating layer is phase modifying layer having a thickness of 5-10 nm.

In some embodiments, all of the coating layers have a thickness less than 200 nm.

In some embodiments, all of the coating layers have a thickness less than λ/2, where λ is a wavelength of incident light.

In some embodiments, the diffractive grating elements are elements of a diffractive in-coupler.

In some embodiments, the diffractive in-coupler is a dual-mode in-coupler.

In some embodiments, the dual-mode in-coupler has a negative overlap angle $$(\theta_i^g).$$

In some embodiments, the overlap angle $$\theta_i^g \leq -4°.$$

A method according to some embodiments includes applying at least two coating layers on a surface of a waveguide substrate and applying a plurality of diffractive grating elements on the surface of the waveguide substrate over the coating layers.

In some embodiments, the coating layers include a first coating layer, a second coating layer, and a third coating layer, the third coating layer being in contact with the substrate, and the second coating layer being between the first coating layer and the third coating layer.

In some embodiments, the substrate has a substrate refractive index, the first coating layer has a first refractive index lower than the substrate refractive index, the second coating layer has a second refractive index higher than the substrate refractive index, and the third coating layer has a third refractive index lower than the substrate refractive index. In some embodiments, the first refractive index and the third refractive index are the same.

Some embodiments further include a fourth coating layer, wherein the fourth coating layer has a fourth refractive index greater than the second refractive index. In some such embodiments, the fourth coating layer is between the first coating layer and the diffractive grating elements. In other embodiments, the fourth coating layer is between the first coating layer and the second coating layer.

In some embodiments, all of the coating layers have a thickness less than 200 nm.

BRIEF DESCRIPTION OF THE DRAWINGS

FIG. 1F is a schematic cross-sectional view of a portion of a waveguide optical device illustrating angles of incident and in-coupled light for dual-mode image propagation with a positive overlap angle $$\theta_i^g.$$

FIG. 1G is a schematic cross-sectional view of a portion of a waveguide optical device illustrating angles of incident and in-coupled light for dual-mode image propagation with a negative overlap angle $$\theta_i^g.$$

is not included.

Figure 8A:
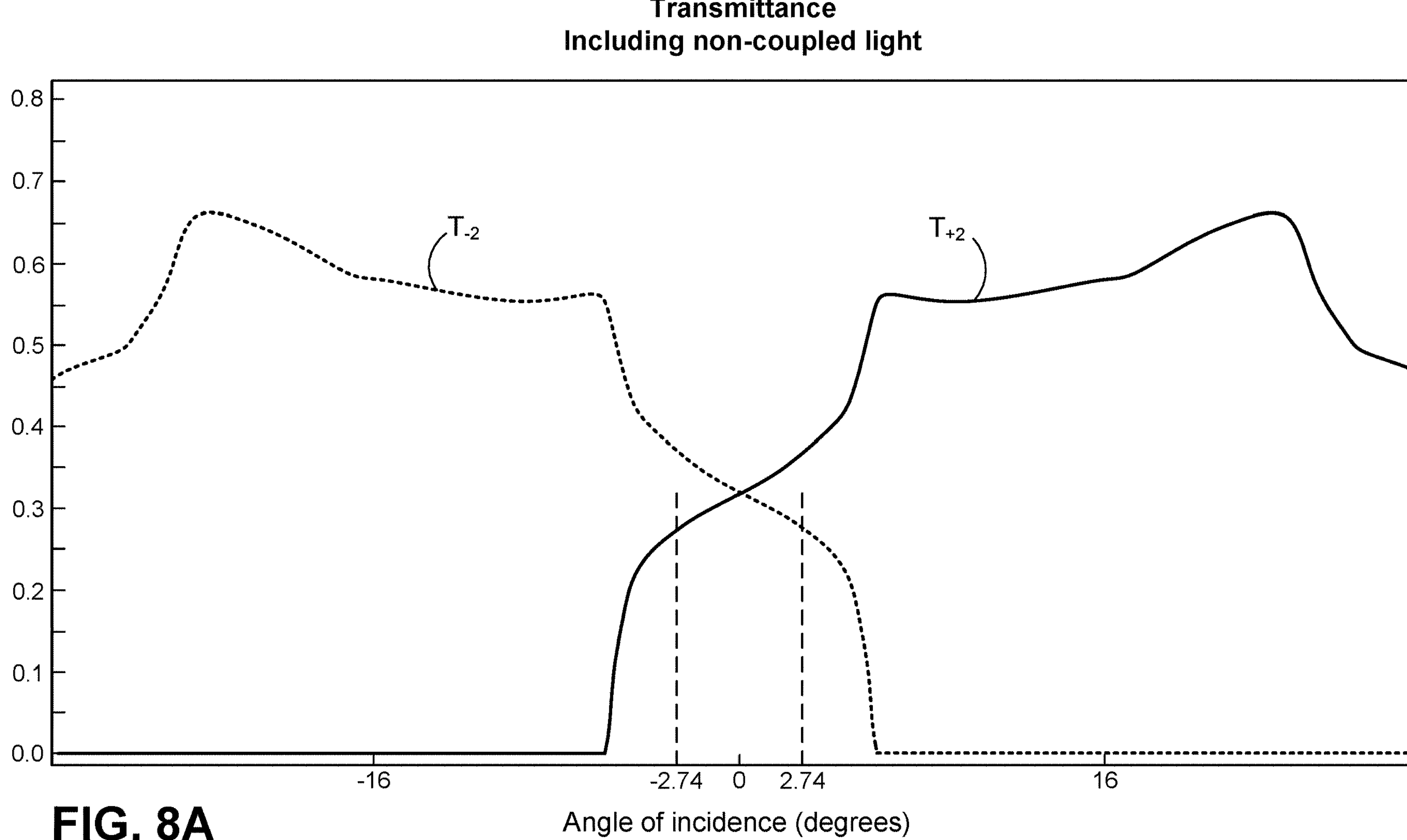
Figure 8B:
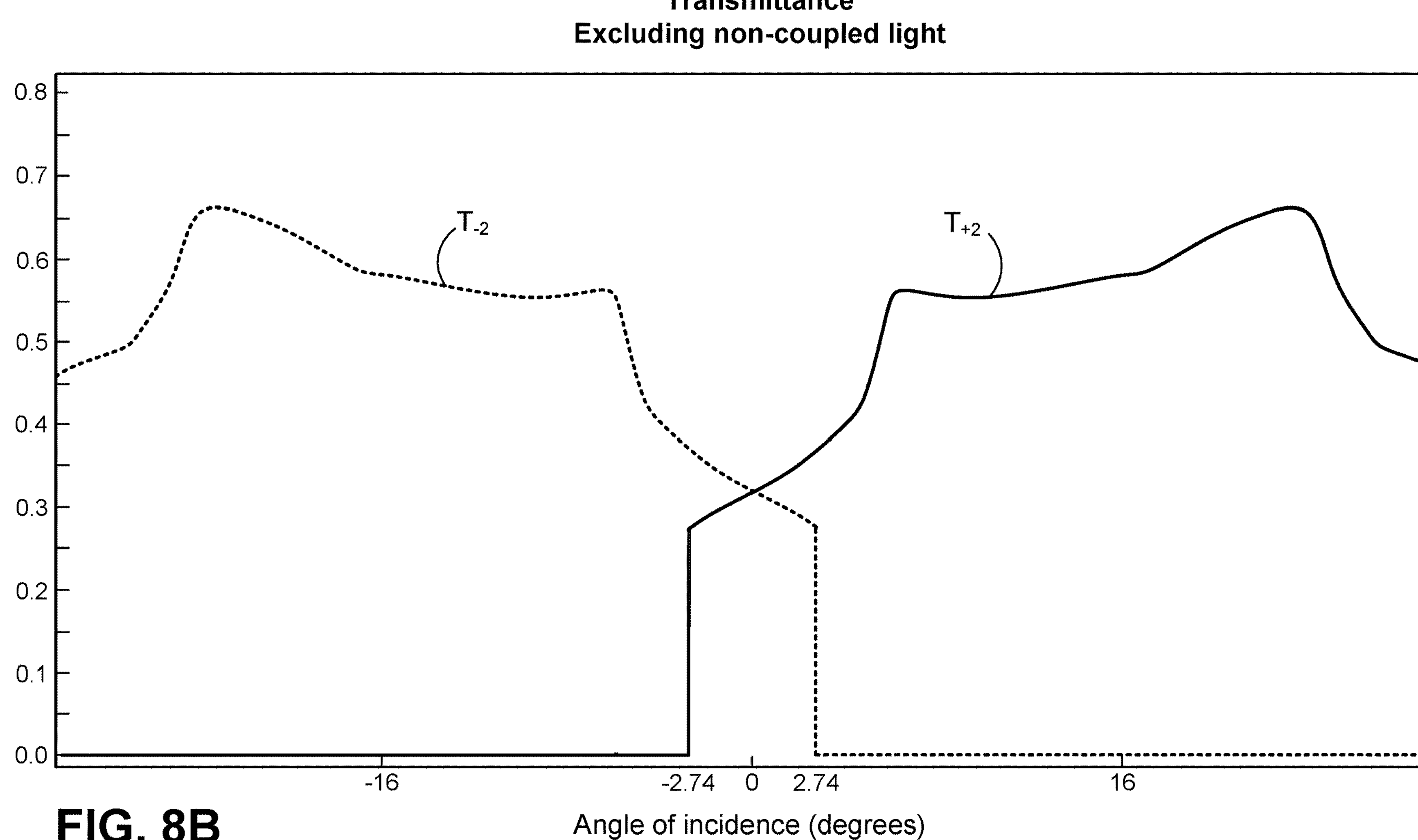

FIGS. 8A and 8B are graphs illustrating the transmittance of the +2 diffraction order and the −2 diffraction order including (8A) and excluding (8B) light that is diffracted to angles that are not coupled into the waveguide.

Figure 9:
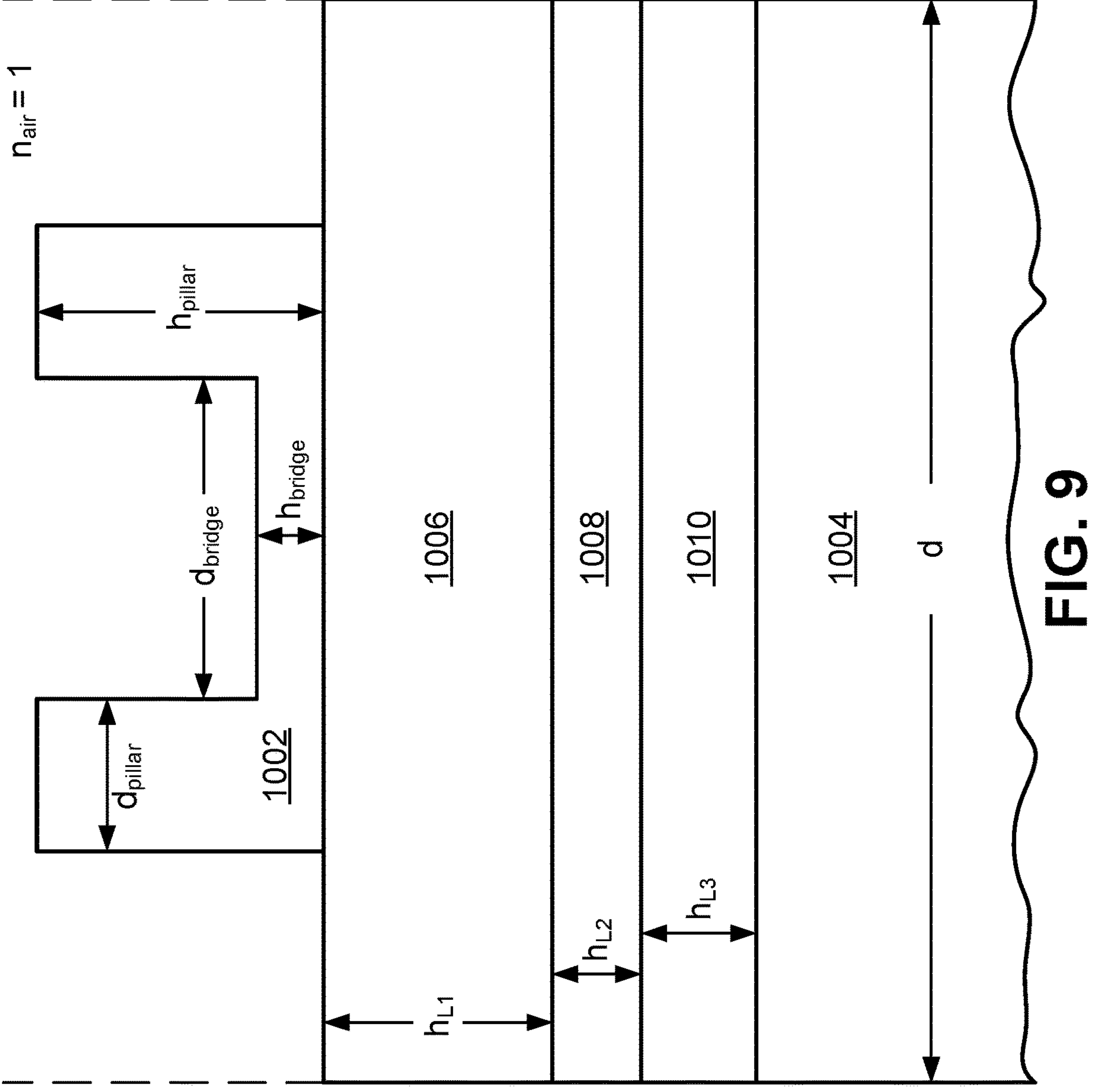

FIG. 9 is a cross sectional view of a unit cell in a diffractive in-coupler according to some embodiments, illustrating three coating layers between the diffractive element and the waveguide substrate.

Figure 10:
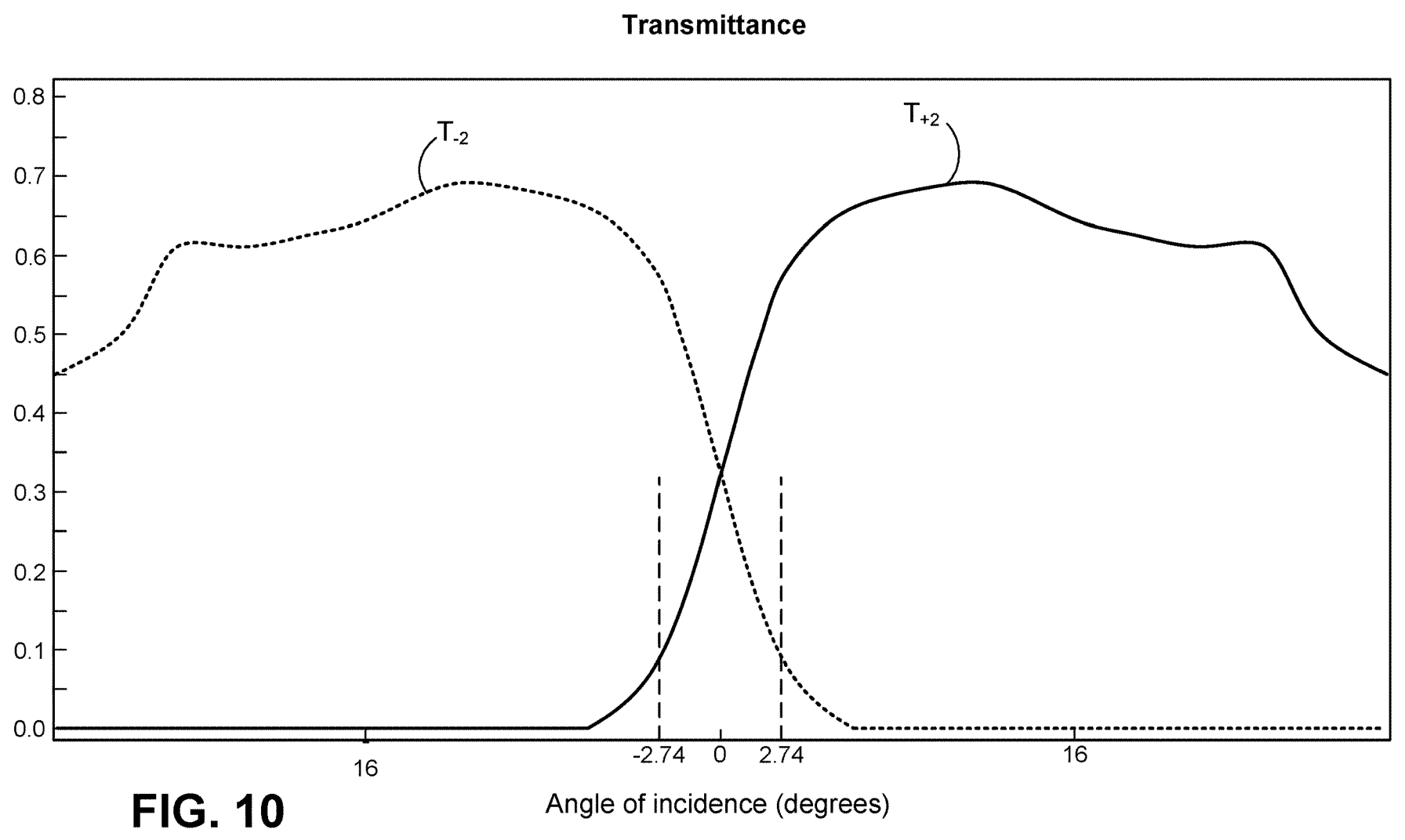

FIG. 10 is a graph illustrating the transmittance of the +2 diffraction order and the −2 diffraction order for an embodiment according to FIG. 9.

Figure 5:
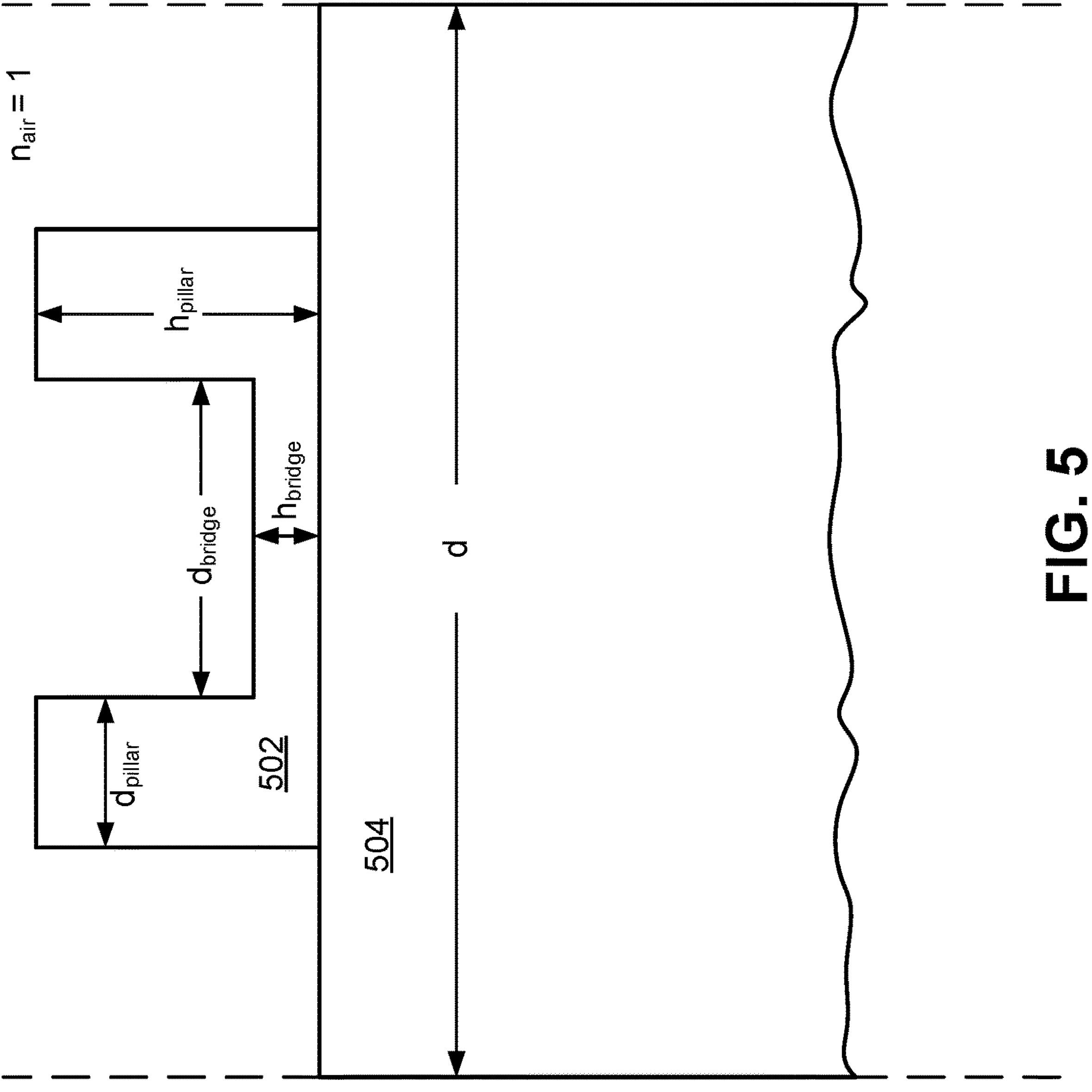
FIG. 5 is a cross sectional view of a unit cell in a diffractive in-coupler without added thin layers.
Figure 11A:
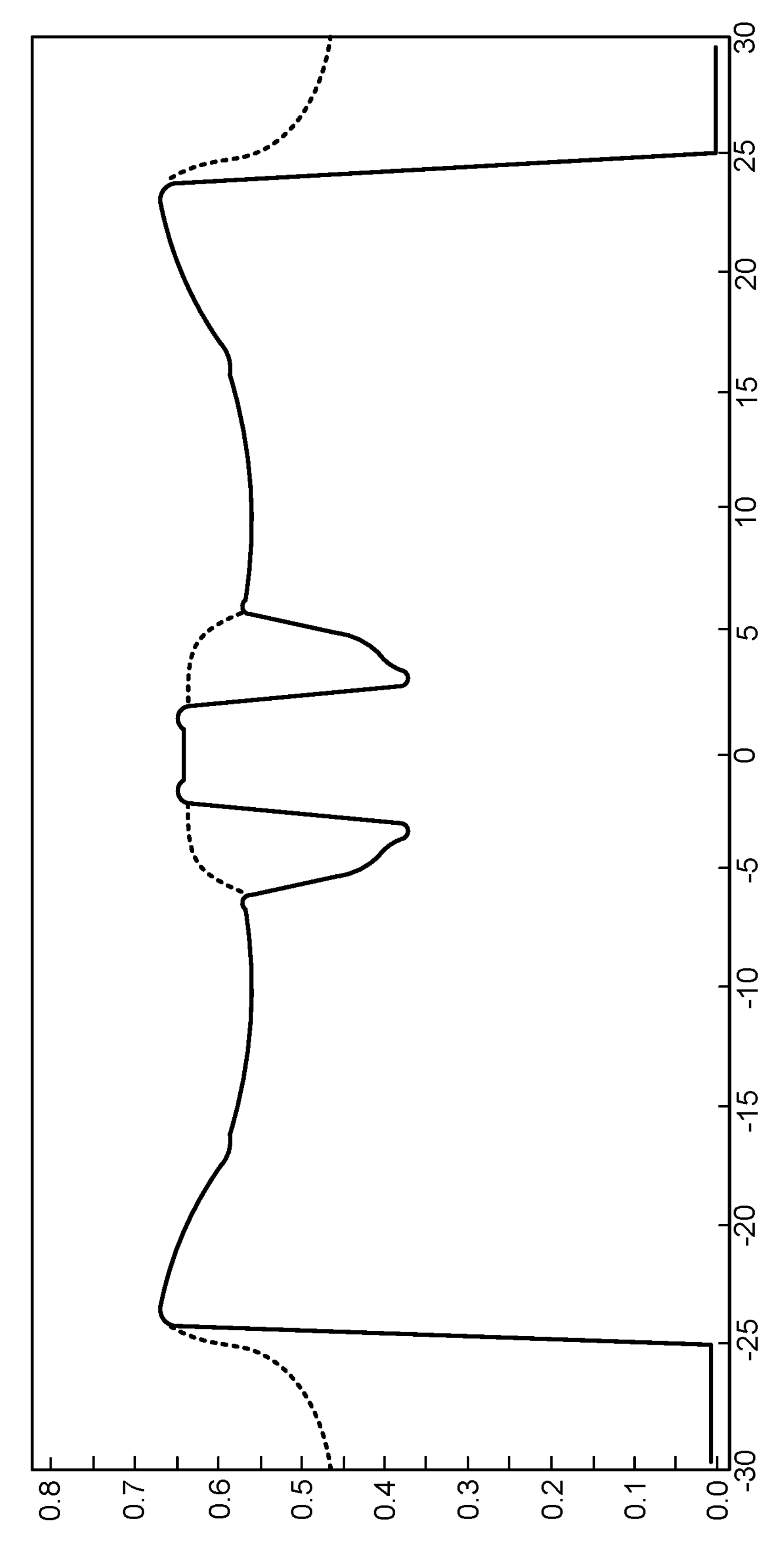

FIG. 11A is a graph illustrating transmittance versus angle of incidence for an embodiment using the u-shaped diffractive elements as in FIG. 5, with no additional layers between the diffractive elements and the body of the waveguide.

Figure 11B:
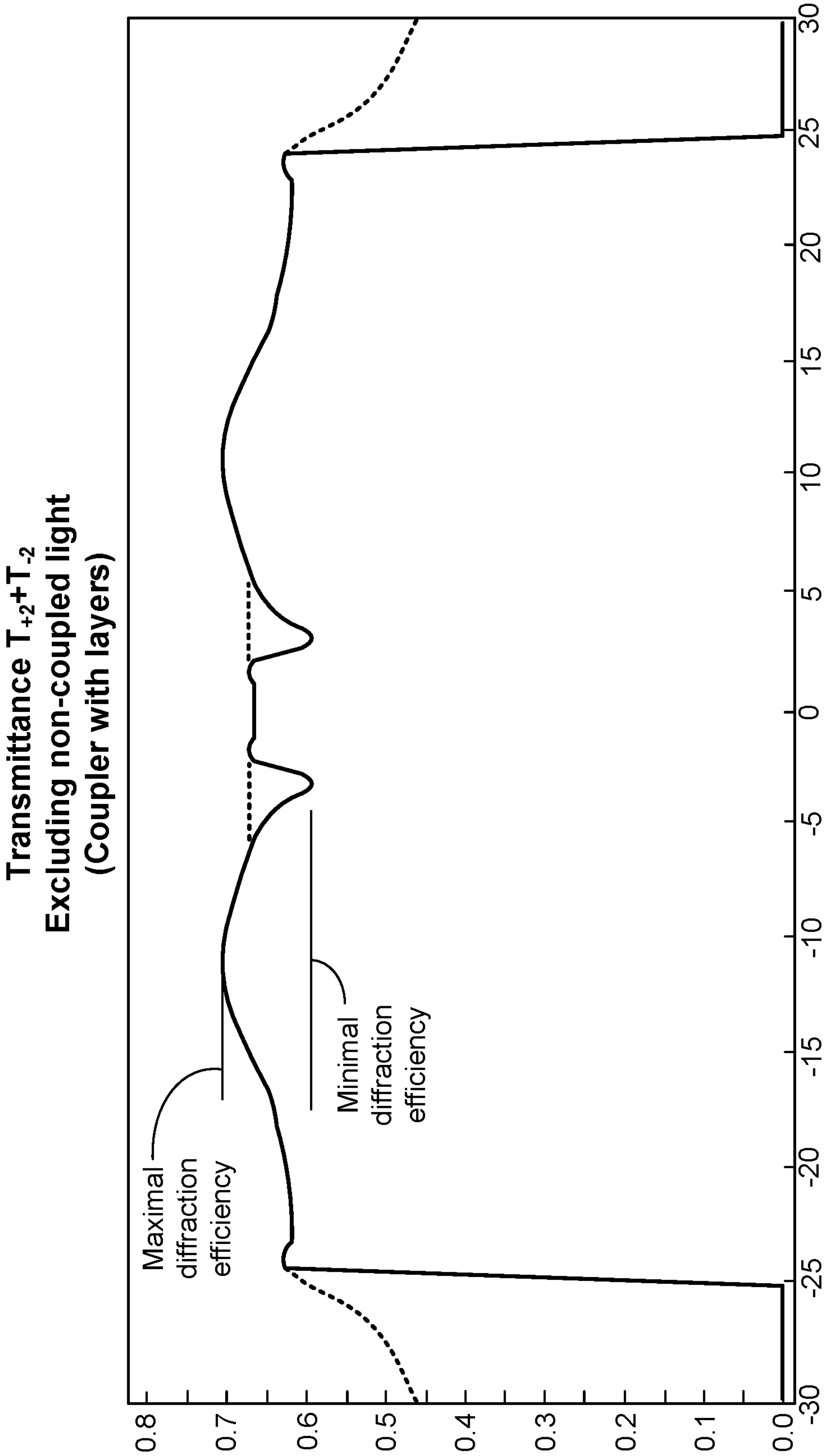

FIG. 11B is a graph illustrating illustrates the transmittance for a system with three layers between the u-shaped diffractive elements and the body of the waveguide as in the embodiment of FIG. 9.

Figure 12:
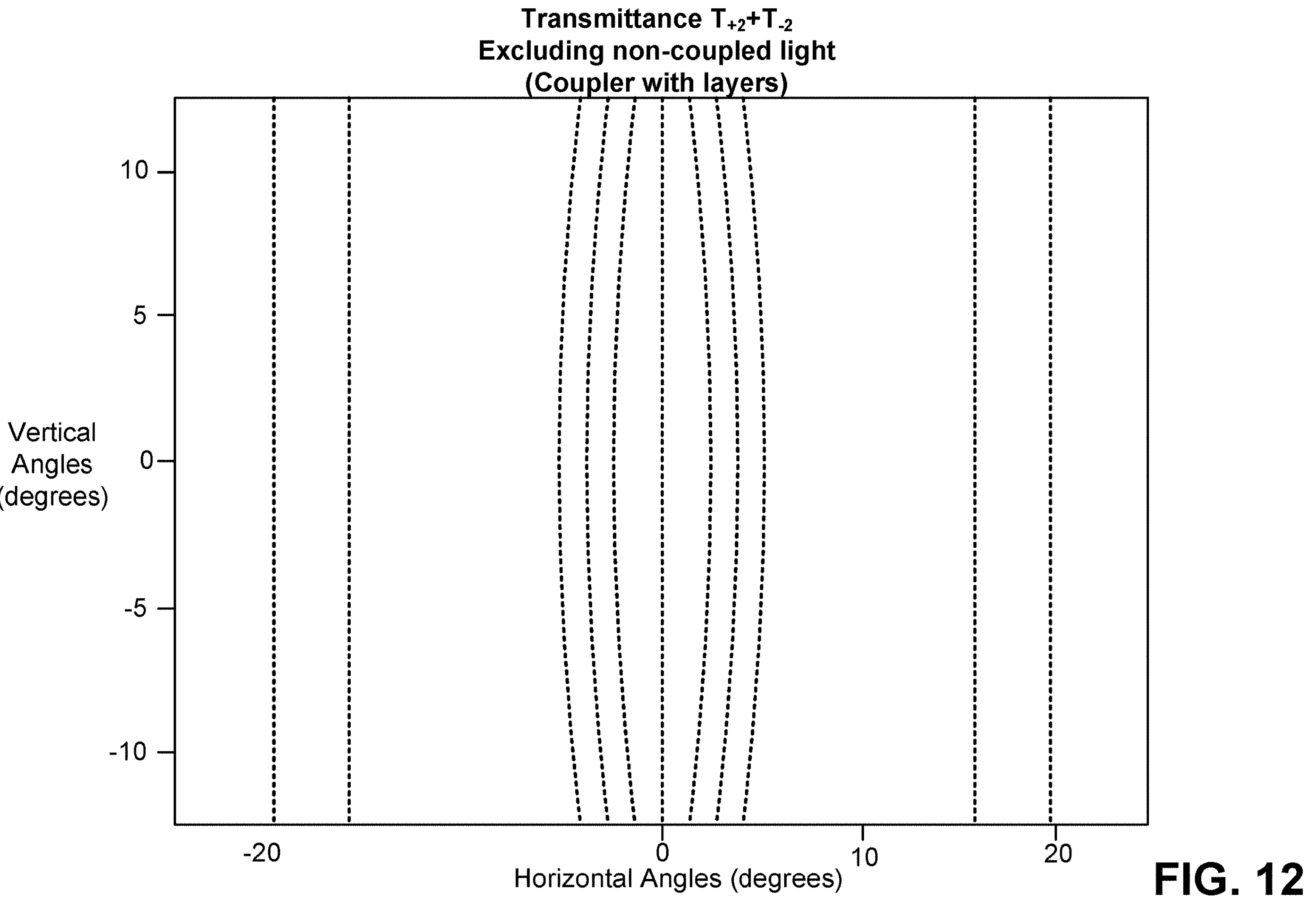

FIG. 12 is a graph that schematically illustrates, for vertical and horizontal angles of incident light, contour lines representing changes in the sum of the transmittance of the +2 and −2 second orders, for a coupler without additional layers, excluding non-coupled light.

Figure 13:
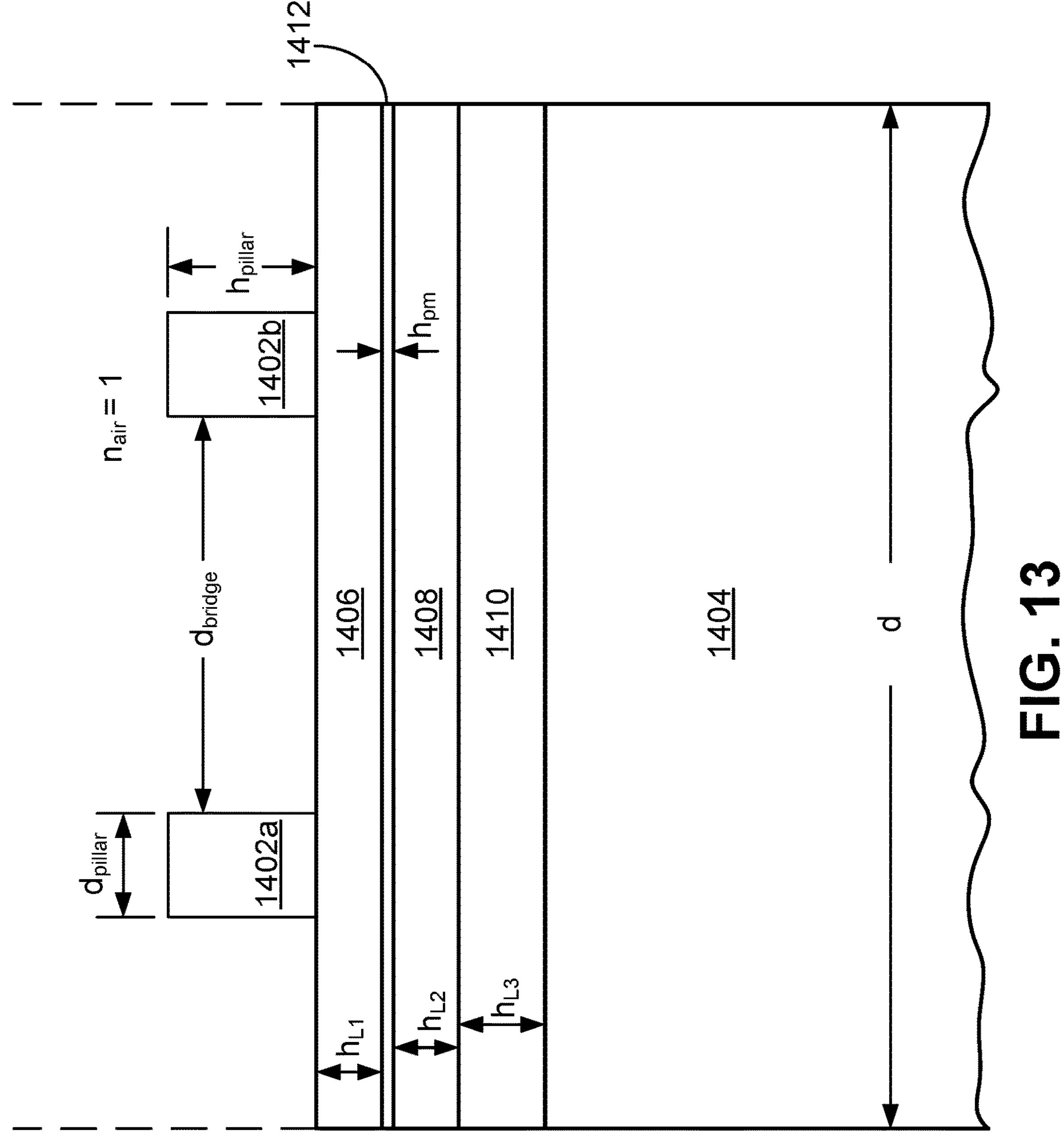

FIG. 13 is a cross sectional view of a unit cell in a diffractive in-coupler according to some embodiments, illustrating four coating layers between the diffractive element and the waveguide substrate.

Figure 14:
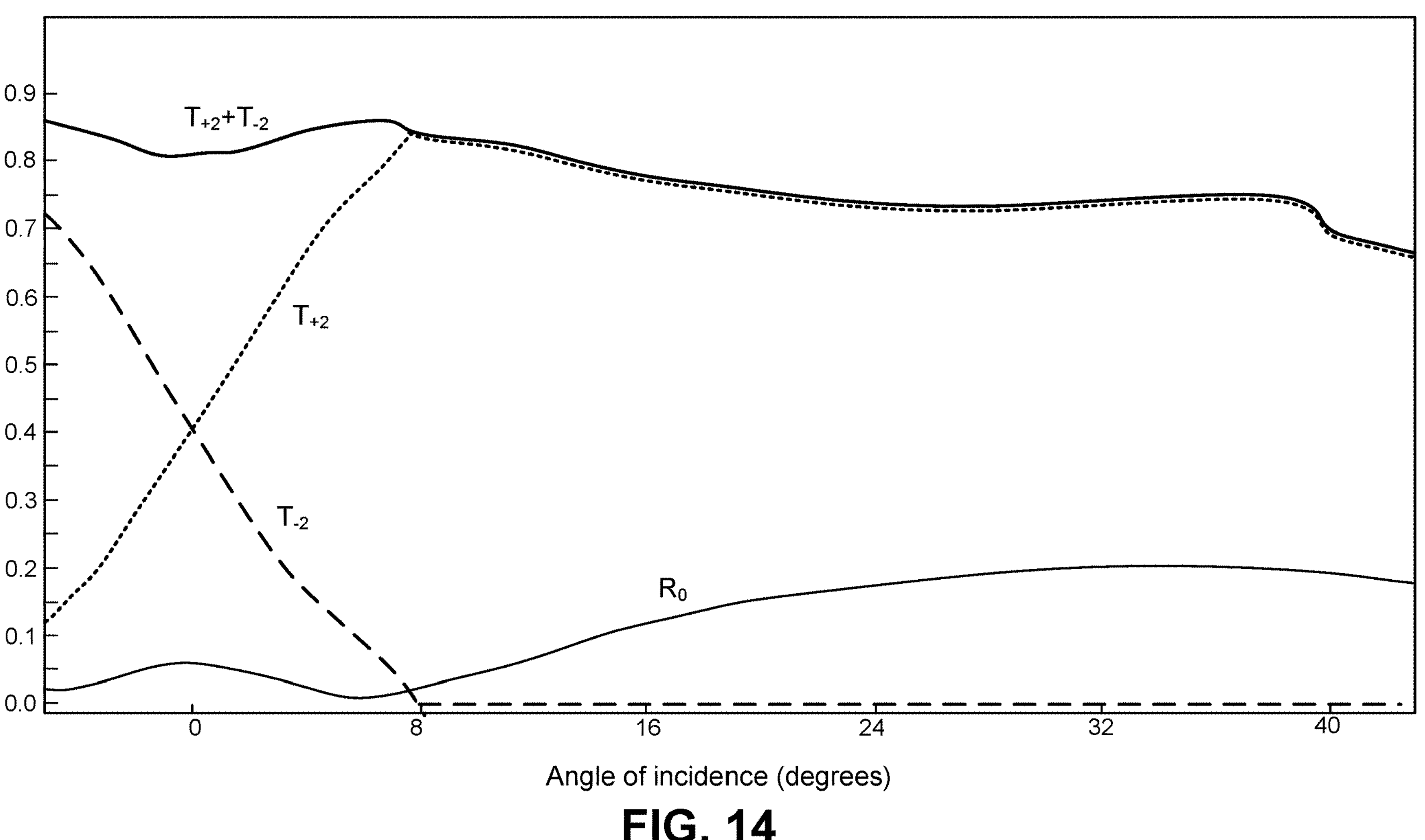

FIG. 14 is a graph of transmittance and reflectance for the embodiment of FIG. 13.

Figure 15:
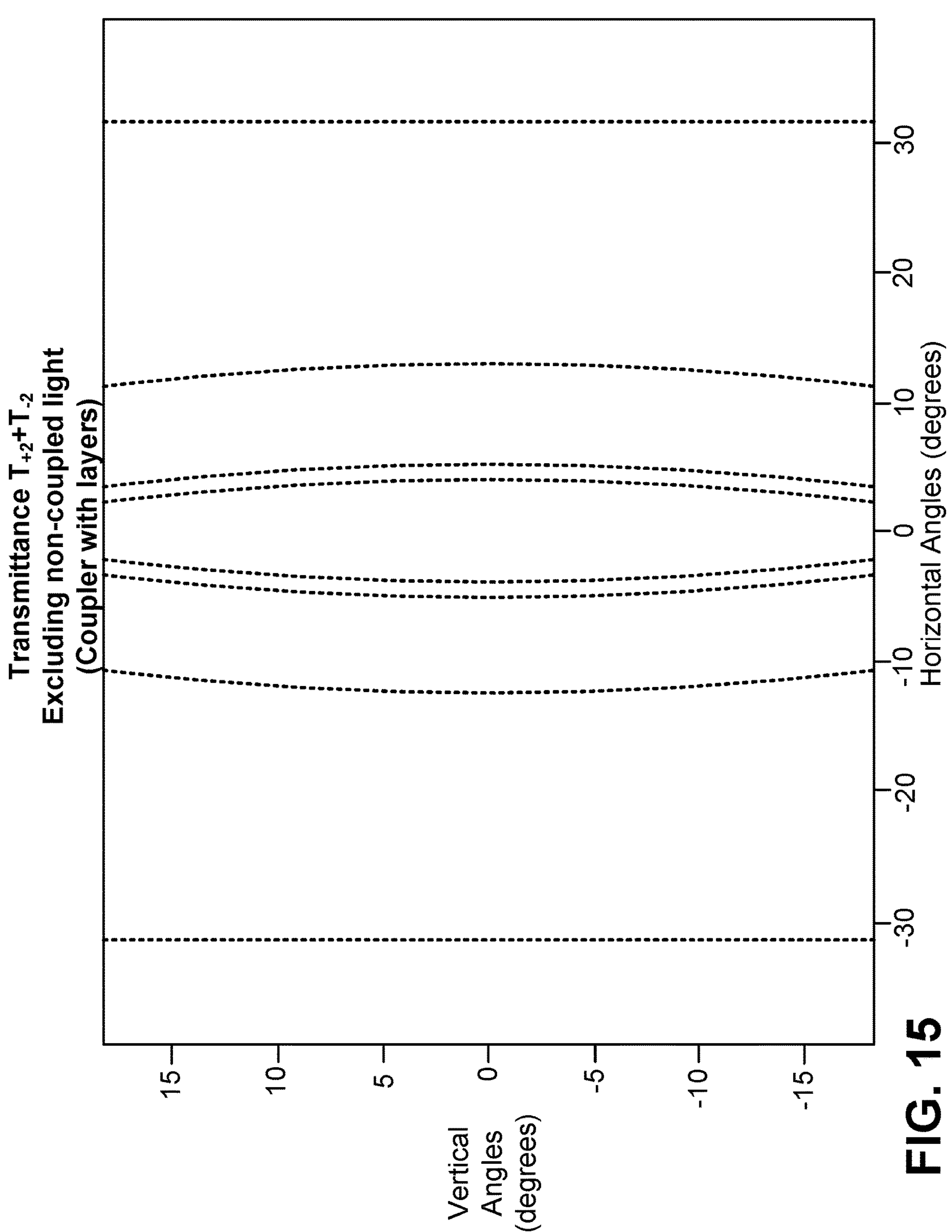

FIG. 15 is a graph that schematically illustrates, for vertical and horizontal angles of incident light, contour lines representing changes in the sum of the transmittance of the +2 and −2 second orders, for the embodiment of FIG. 14, excluding non-coupled light.

Figure 16:
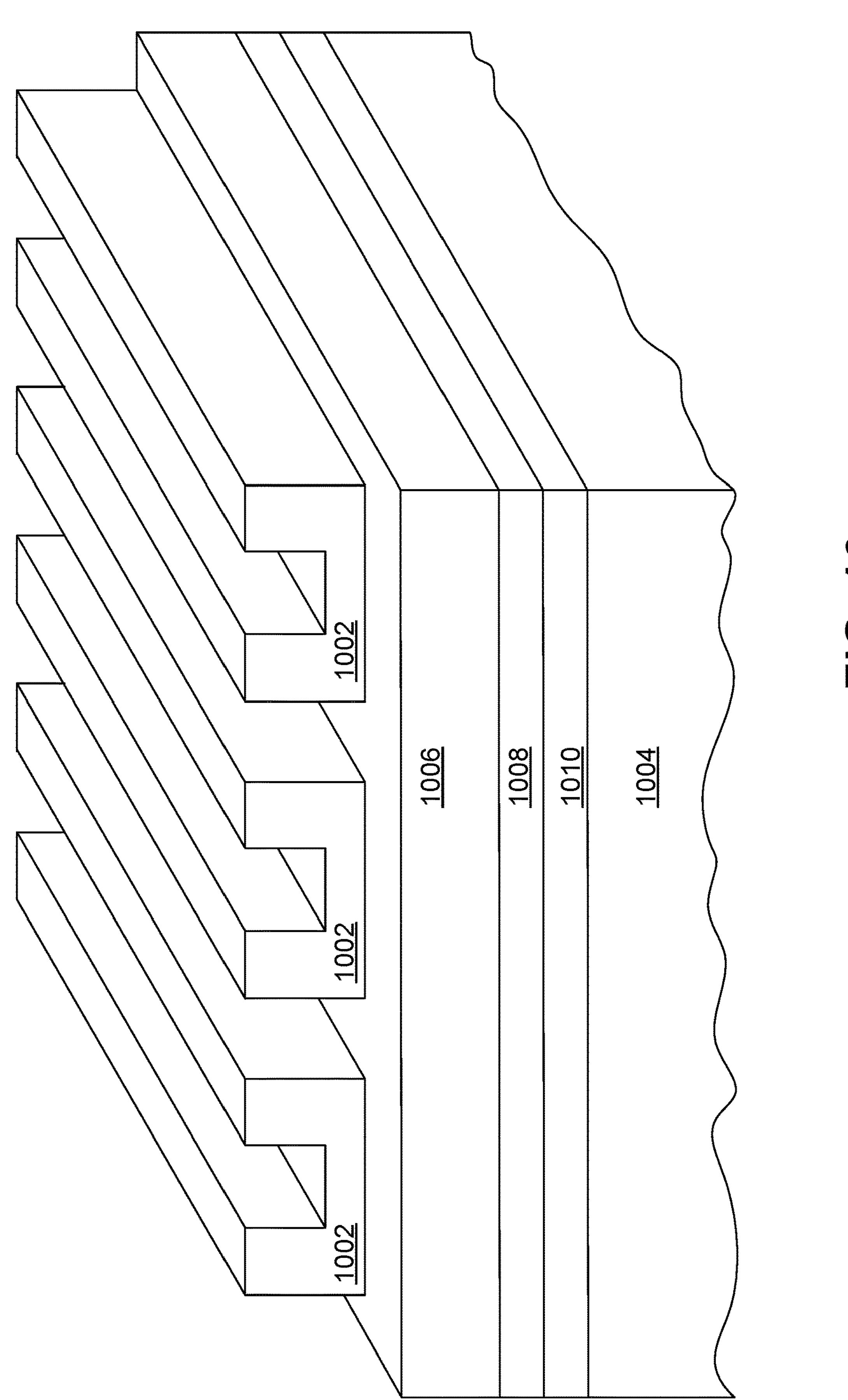

FIG. 16 is a partial cutaway schematic perspective view of the embodiment of FIG. 9.

Figure 17:
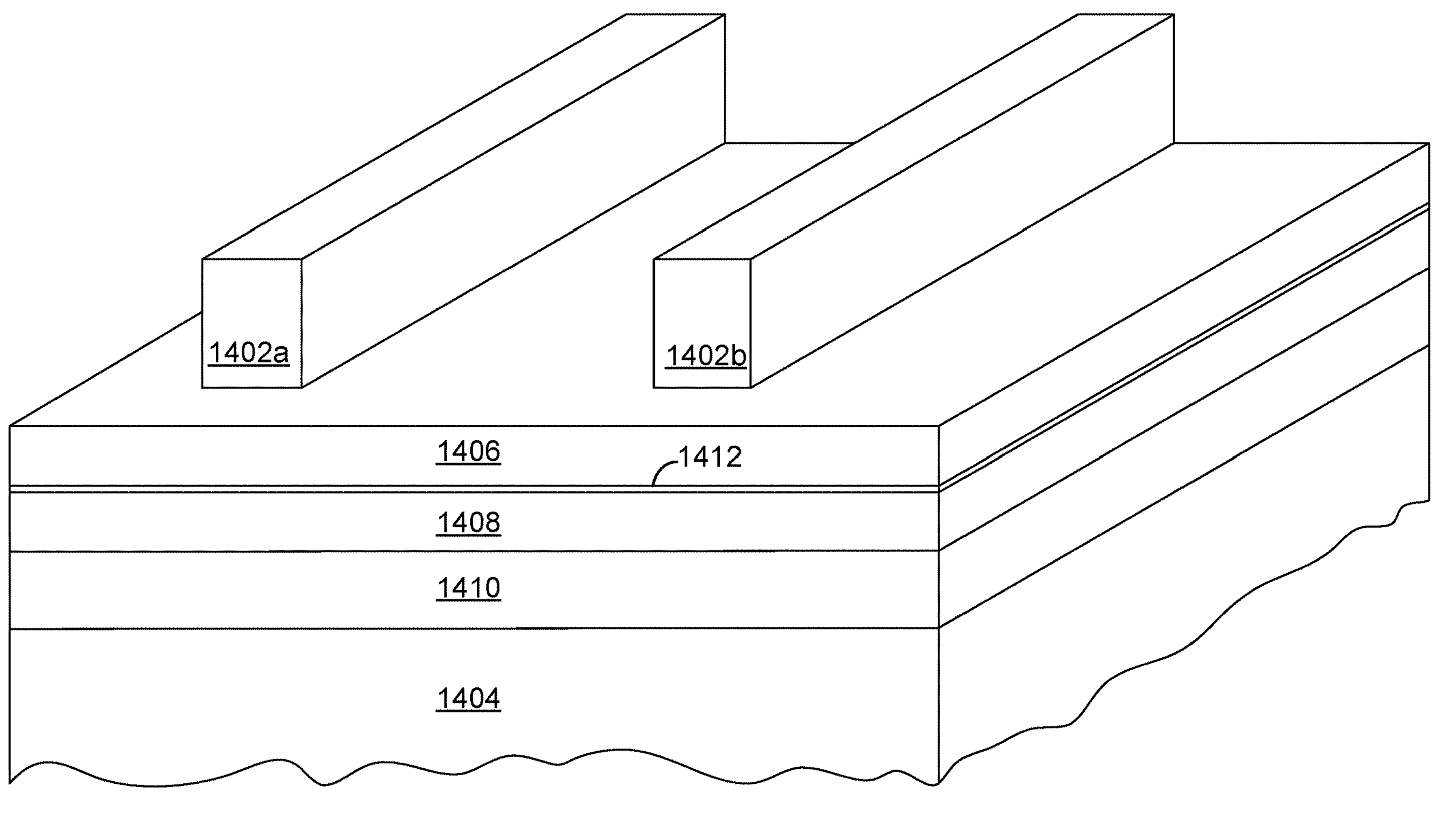

FIG. 17 is a partial cutaway schematic perspective view of the embodiment of FIG. 13.

Figure 18:
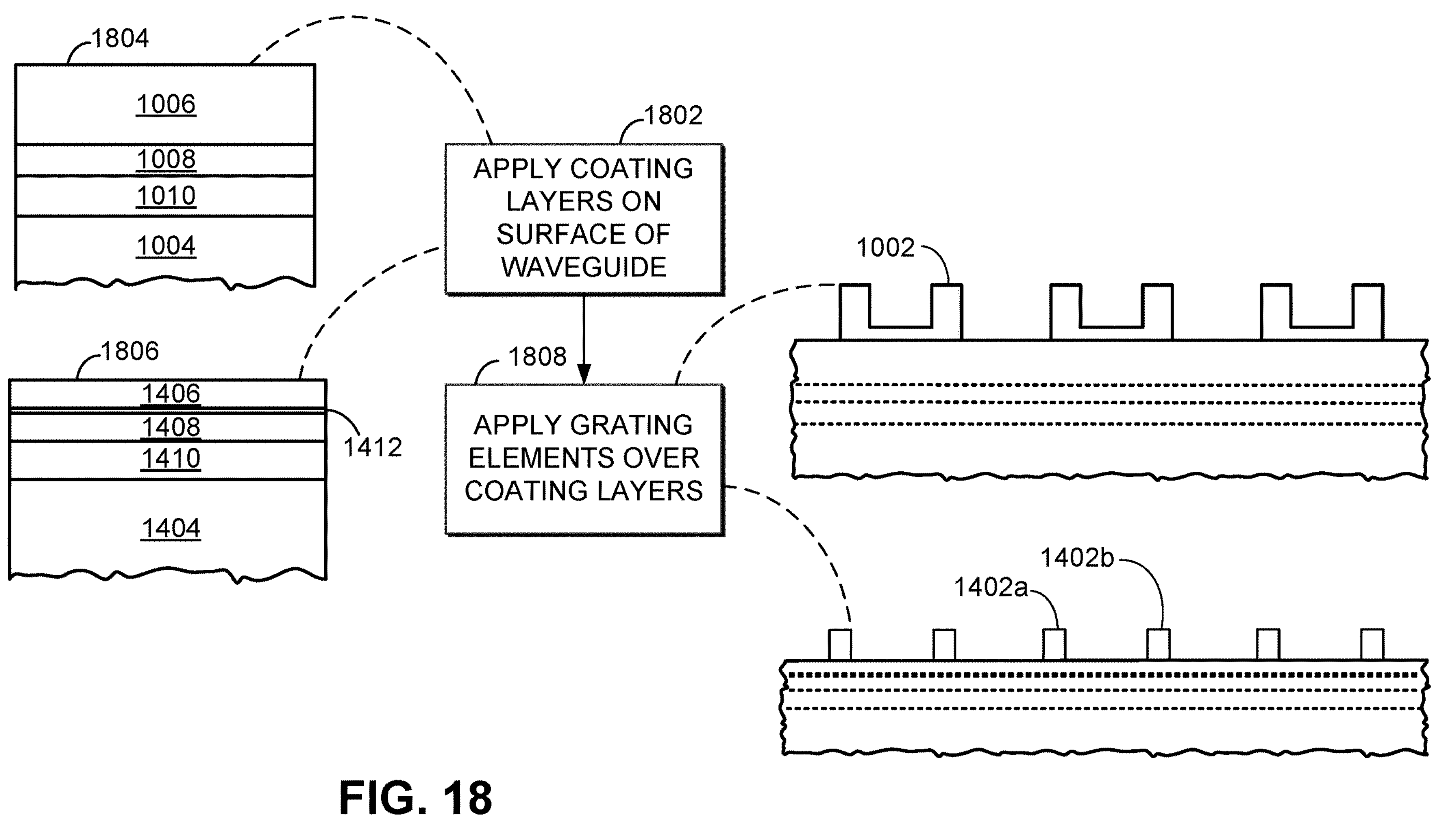

FIG. 18 is a schematic flow diagram illustrating a method according to some embodiments.

DETAILED DESCRIPTION

The present disclosure relates to the field of optics and photonics, and more specifically to optical devices comprising at least one diffraction grating. Diffraction gratings as described herein may be employed in the field of conformable and wearable optics, such as AR/VR glasses, as well as in a variety of other electronic consumer products comprising displays and/or lightweight imaging systems. Example devices for application may include head-mounted displays (HMD) and lightfield capture devices. Such diffraction gratings may find application in solar cells.

Example optical devices are described that include one or more over-wavelength diffraction gratings that can be used for in-coupling light into the optical device and/or out coupling light from the optical device. Such optical devices can be used as a waveguide for AR/VR glasses for instance.

Figure 1A:
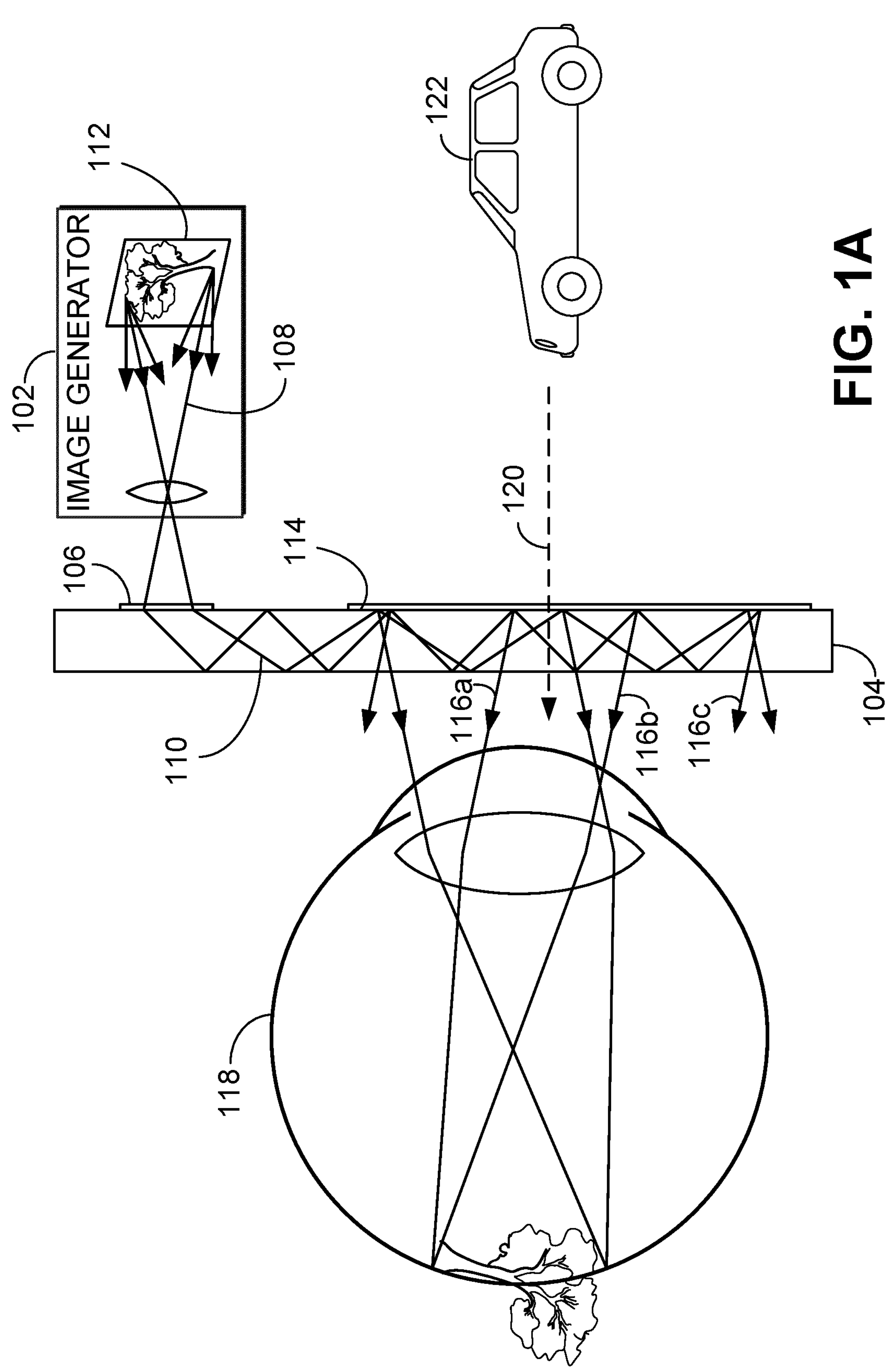
FIG. 1A is a cross-sectional schematic view of a waveguide display.

An example waveguide display device that may employ diffraction grating structures as described herein is illustrated in FIG. 1A. FIG. 1A is a schematic cross-sectional side view of a waveguide display device in operation. An image is projected by an image generator 102. The image generator 102 may use one or more of various techniques for projecting an image. For example, the image generator 102 may be a laser beam scanning (LBS) projector, a liquid crystal display (LCD), a light-emitting diode (LED) display (including an organic LED (OLED) or micro LED (μLED) display), a digital light processor (DLP), a liquid crystal on silicon (LCoS) display, or other type of image generator or light engine.

Light representing an image 112 generated by the image generator 102 is coupled into a waveguide 104 by a diffractive in-coupler 106. The in-coupler 106 diffracts the light representing the image 112 into one or more diffractive orders. For example, light ray 108, which is one of the light rays representing a portion of the bottom of the image, is diffracted by the in-coupler 106, and one of the diffracted orders 110 (e.g. the second order) is at an angle that is capable of being propagated through the waveguide 104 by total internal reflection.

At least a portion of the light 110 that has been coupled into the waveguide 104 by the diffractive in-coupler 106 is coupled out of the waveguide by a diffractive out-coupler 114. At least some of the light coupled out of the waveguide 104 replicates the incident angle of light coupled into the waveguide. For example, in the illustration, out-coupled light rays 116*a*, 116*b*, and 116*c* replicate the angle of the in-coupled light ray 108. Because light exiting the out-coupler replicates the directions of light that entered the in-coupler, the waveguide substantially replicates the original image 112. A user's eye 118 can focus on the replicated image.

In the example of FIG. 1A, the out-coupler 114 out-couples only a portion of the light with each reflection, allowing a single input beam (such as beam 108) to generate multiple parallel output beams (such as beams 116*a*, 116*b*, and 116*c*). In this way, at least some of the light originating from each portion of the image is likely to reach the user's eye even if the eye is not perfectly aligned with the center of the out-coupler. For example, if the eye 118 were to move downward, beam 116*c* may enter the eye even if beams 116*a* and 116*b* do not, so the user can still perceive the bottom of the image 112 despite the shift in position. The out-coupler 114 thus operates in part as an exit pupil expander in the vertical direction. The waveguide may also include one or more additional exit pupil expanders (not shown in FIG. 1A) to expand the exit pupil in the horizontal direction.

In some embodiments, the waveguide 104 is at least partly transparent with respect to light originating outside the waveguide display. For example, at least some of the light 120 from real-world objects (such as object 122) traverses the waveguide 104, allowing the user to see the real-world objects while using the waveguide display. As light 120 from real-world objects also goes through the diffraction grating 114, there will be multiple diffraction orders and hence multiple images. To minimize the visibility of multiple images, it is desirable for the diffraction order zero (no deviation by 114) to have a great diffraction efficiency for light 120 and order zero, while higher diffraction orders are lower in energy. Thus, in addition to expanding and out-coupling the virtual image, the out-coupler 114 is preferably configured to let through the zero order of the real image. In such embodiments, images displayed by the waveguide display may appear to be superimposed on the real world.

In some embodiments, as described in further detail below, a waveguide display includes more than one waveguide layer. Each waveguide layer may be configured to preferentially convey light with a particular range of wavelengths and/or incident angles from the image generator to the viewer.

Figures 1B, 1C:
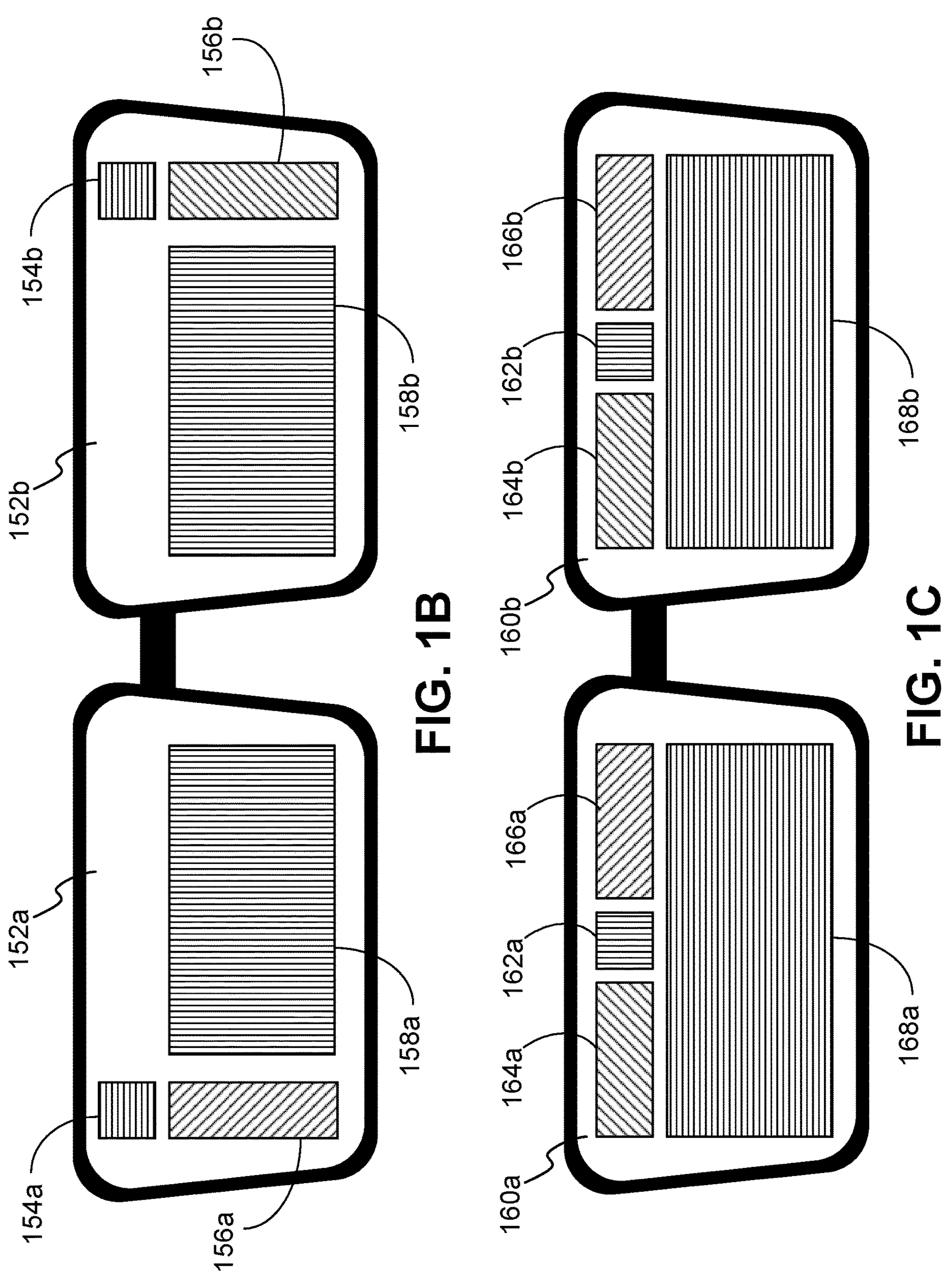
FIG. 1B is a schematic illustration of a binocular waveguide display with a first layout of diffractive optical components.
FIG. 1C is a schematic illustration of a binocular waveguide display with a second layout of diffractive optical components using dual-mode image propagation.

As illustrated in FIGS. 1B and 1C, waveguide displays having in-couplers, out-couplers, and pupil expanders may have various different configurations. An example layout of one binocular waveguide display is illustrated in FIG. 1B. In the example of FIG. 1B, the display includes waveguides 152*a*, 152*b* for the left and right eyes, respectively. The waveguides include in-couplers 154*a,b*, pupil expanders 156*a,b*, and components 158*a,b*, which operate as both out-couplers and horizontal pupil expanders. The pupil expanders 156*a,b* are arranged along an optical path between the in-coupler and the out-coupler. An image generator (not shown) may be provided for each eye and arranged to project light representing an image on the respective in-coupler.

An example layout of another binocular waveguide display is illustrated in FIG. 1C. In the example of FIG. 1C, the display includes waveguides 160*a*, 160*b* for the left and right eyes, respectively. The waveguides include in-couplers 162*a,b*. Light from different portions of an image may be coupled by the in-couplers 162*a,b* to different directions within the waveguides. In-coupled light traveling toward the left passes through pupil expanders 164*a,b*, while in-coupled light traveling toward the right passes through pupil expanders 166*a,b*. Having passed through the pupil expanders, light is coupled out of the waveguides using components 168*a,b*, which operate as both out-couplers and vertical pupil expanders to substantially replicate an image provided at the in-couplers 162*a,b*.

In different embodiments, different features of the waveguide displays may be provided on different surfaces of the waveguides. For example (as in the configuration of FIG. 1A), the in-coupler and the out-coupler may both be arranged on the anterior surface of the waveguide (away from the user's eye).

In other embodiments, the in-coupler and/or the out-coupler may be on a posterior surface of the waveguide (toward the user's eye). The in-coupler and out-coupler may be on opposite surfaces of the waveguide. In some embodiments, one or more of an in-coupler, an out-coupler, and a pupil expander, may be present on both surfaces of the waveguide. The image generator may be arranged toward the anterior surface or toward the posterior surface of the waveguide. The in-coupler is not necessarily on the same side of the waveguide as the image generator. Any pupil expanders in a waveguide may be arranged on the anterior surface, on the posterior surface, or on both surfaces of the waveguide. In displays with more than one waveguide layer, different layers may have different configurations of in-coupler, out-coupler, and pupil expander.

Figures 1D, 1E:
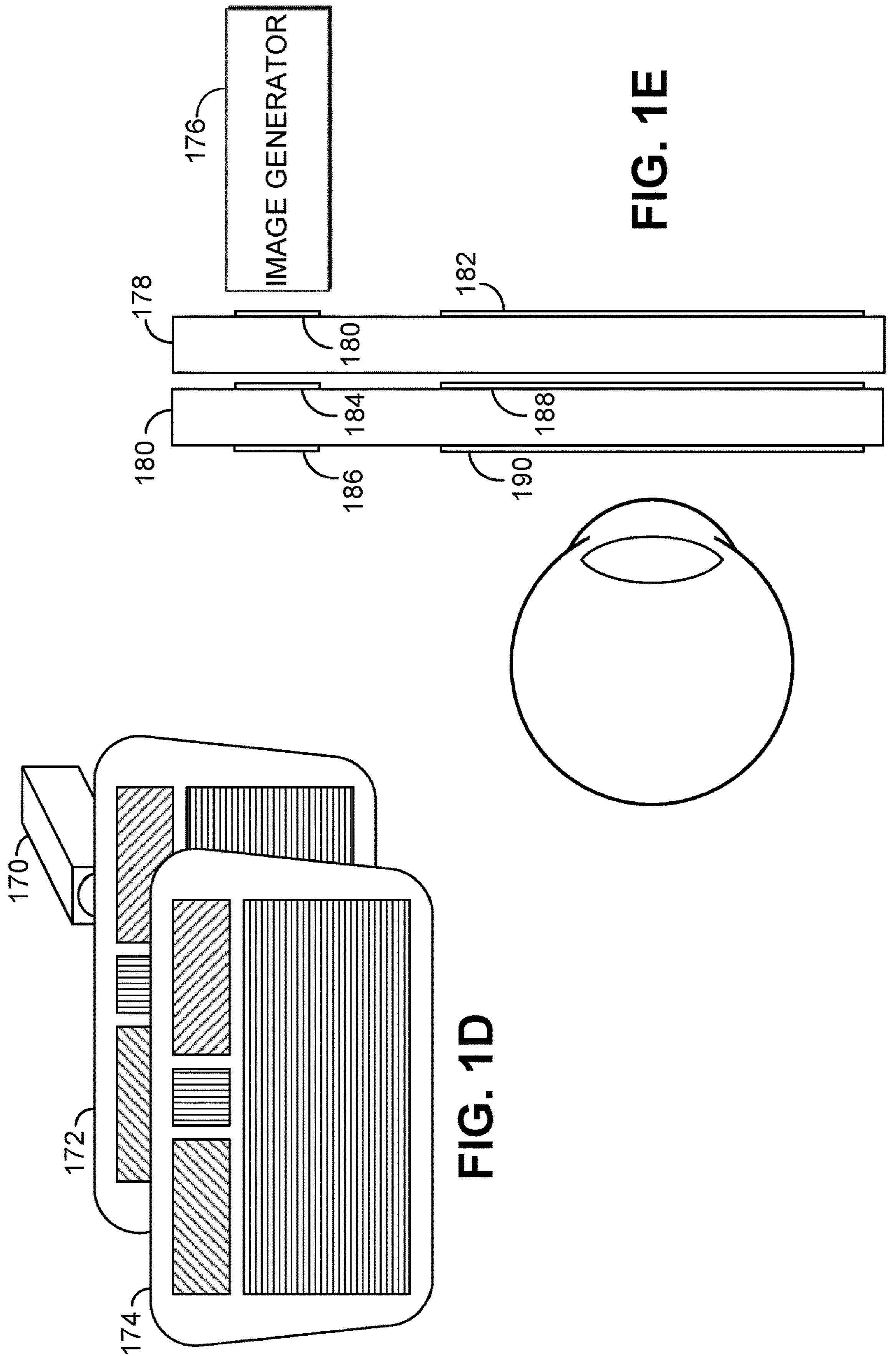
FIG. 1D is a schematic exploded view of a double-waveguide display according to some embodiments.
FIG. 1E is a cross-sectional schematic view of a double-waveguide display according to some embodiments.

FIG. 1D is a schematic exploded view of a double waveguide display according to some embodiments, including an image generator 170, a first waveguide ($WG_1$) 172, and a second waveguide ($WG_2$) 174. FIG. 1E is a schematic side-view of a double waveguide display according to some embodiments, including an image generator 176, a first waveguide ($WG_1$) 178, and a second waveguide ($WG_2$) 180. The first waveguide includes a first transmissive diffractive in-coupler (DG1) 180 and a first diffractive out-coupler (DG6) 182. The second waveguide has a second transmissive diffractive in-coupler (DG2) 184, a reflective diffractive in-coupler (DG3) 186, a second diffractive out-coupler (DG4) 188, and a third diffractive out-coupler (DG5) 190. Different embodiments may use different arrangements of optical components (such as different arrangements of pupil expanders) on the first and second waveguides.

While FIGS. 1A-1E illustrate the use of waveguides in a near-eye display, the same principles may be used in other display technologies, such as head up displays for automotive or other uses.

FIG. 1F is a schematic cross-sectional view of a waveguide optical device illustrating angles of incident and in-coupled light for a dual-mode diffractive in-coupler, which couples one portion of the field of view into the waveguide using a positive diffractive order and another portion of the field of view into the waveguide using a negative diffractive order. The grating pitch of one or more diffractive gratings as described herein may be selected based on desired ranges of and relationships between the incident and the in-coupled light.

Example In-Coupler Structures

Example embodiments are provided with in-coupler structures that provide relatively high uniformity of in-coupling at different angles of incidence.

For determining the pitch size of the in-coupler, the angles of two rays inside of the waveguide may be considered: the critical angle which is the smallest polar angle $$\theta_d^c$$

for which there is total internal reflection (TIR) and the grazing angle $$\theta_d^g.$$

There is an additional parameter in the design, the so-called overlap angle. On the figure, $$\theta_i^g$$

is the overlap angle. On FIG. 1F, the overlap angle is positive.

In some embodiments, the pitch size for the grating may be selected according to the formula:

$$\Lambda_M = \frac{M\lambda}{n_d \sin\theta_d^g + n_i \sin\theta_i^g} \quad \text{eq. 2}$$

where M is the diffraction order, λ is a wavelength of incident light, $n_d$ is the index of refraction of the waveguide, and n is the index of the surrounding media (which may be 1.0). As an example, the grazing angle may be selected to have a value of $$\theta_d^g = 75°,$$

but other values such as 70°, 65° or even 60° may alternatively be chosen.

Figure 2:
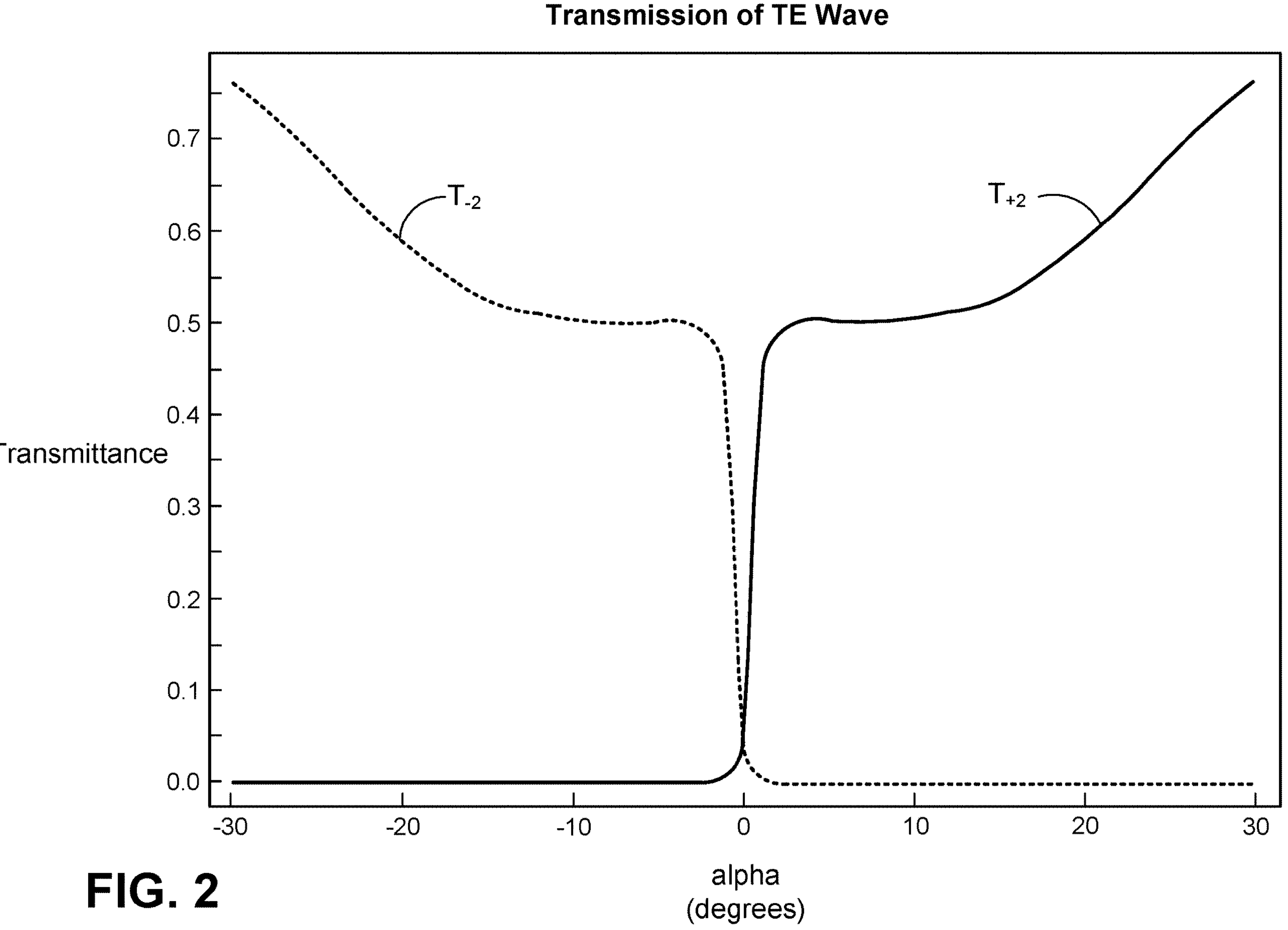
FIG. 2 is a graph illustrating transmittance values for a dual-mode in-coupler grating that uses a positive overlap angle $$\theta_i^g.$$

An embodiment of a dual-mode in-coupler grating that uses a positive overlap, as in FIG. 1F, may have diffraction efficiency curves as shown in FIG. 2. In the example of FIG. 2, for normal incidence, the curves for the diffraction efficiency of the positive and negative second order have near zero values. Hence, the pixels displayed around the optical axis of the system will not be coupled into and transported through the waveguide.

Figure 3:
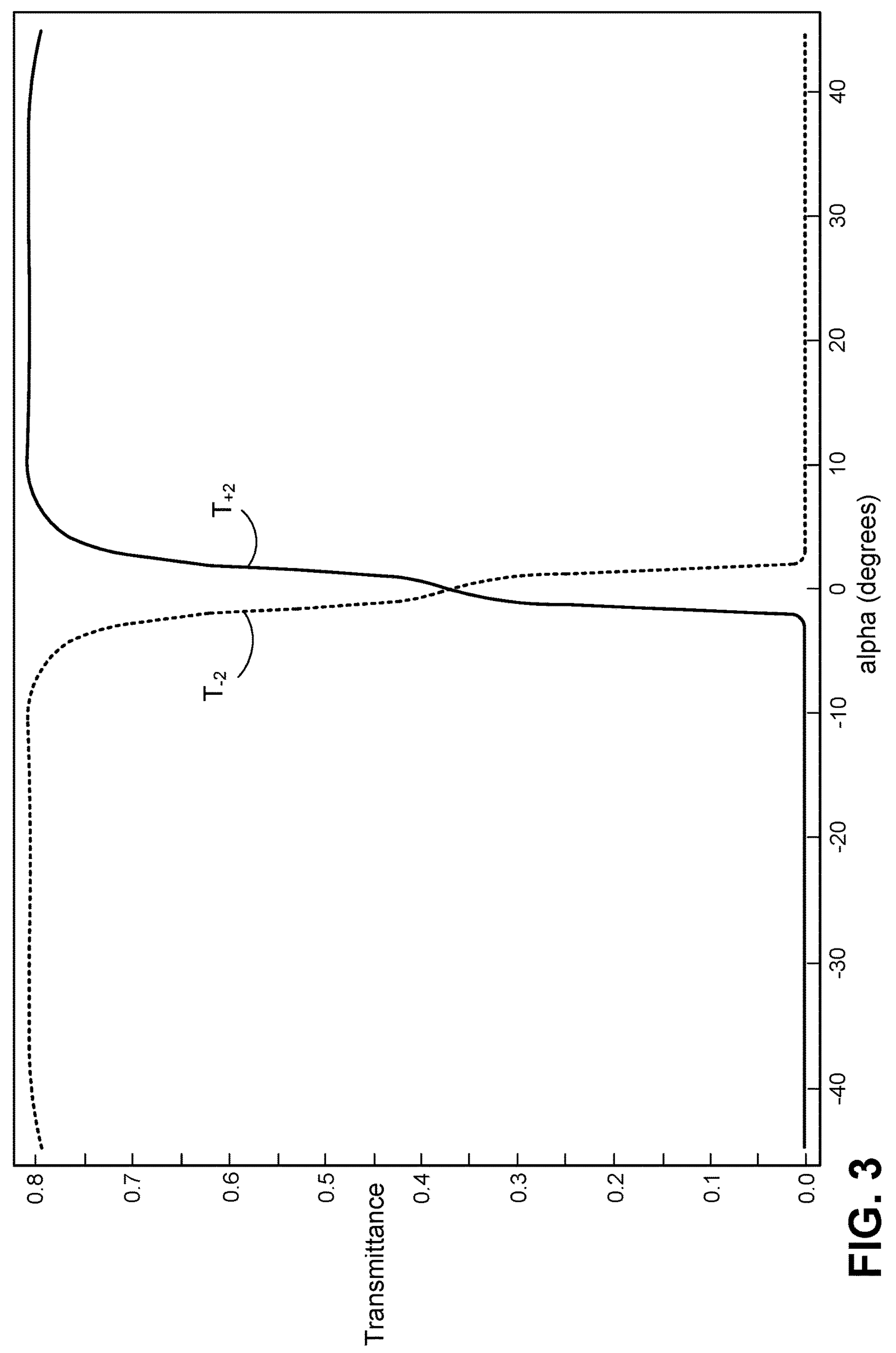
FIG. 3 is a graph illustrating transmittance values for a dual-mode in-coupler grating that uses a negative overlap angle $$\theta_i^g.$$

To address that issue, a dual-mode in-coupler may be provided having a negative overlap (the angle $$\theta_i^g$$

will be negative), as in FIG. 1G. Diffraction efficiency curves for an example in-coupler having negative overlap are illustrated in FIG. 3. A ray hitting the in-coupler at normal incidence will be partly diffracted (diffraction efficiency of 37.5%) into the positive second order and partly into the negative second order. Which means that, in this example, the incoming ray at normal incidence is present in the system with a power of 70% proportionally to its incoming power.

Figure 4:
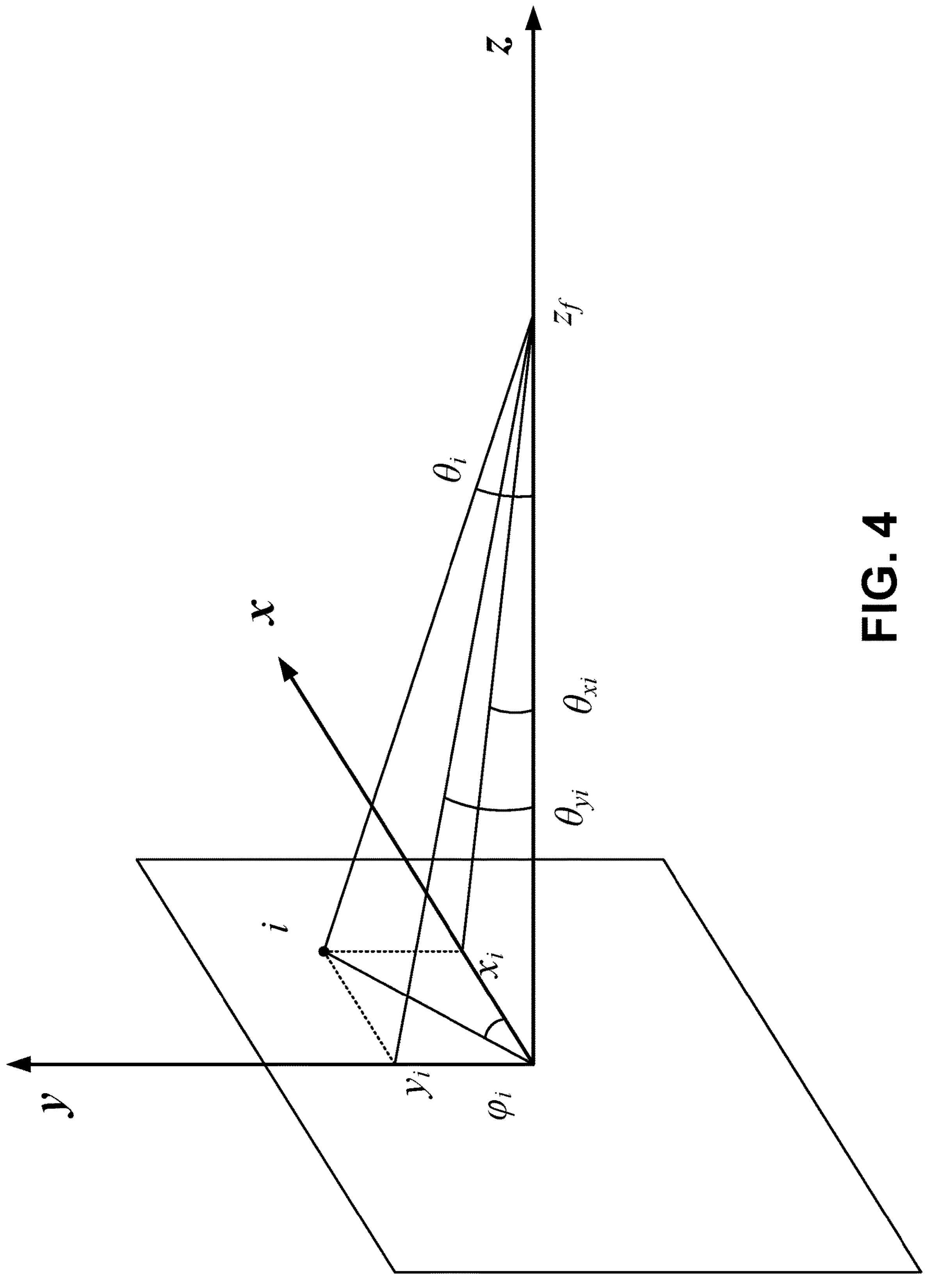
FIG. 4 is a schematic perspective view showing some parameters used to describe conical incidence.

In some embodiments, uniformity of diffraction efficiency may be improved by appropriate selection of the overlap angle. Such selections may improve the uniformity for in-plane angles of incidence (rays in the plane of FIGS. 1F-1G). However, it is also desirable to improve uniformity for incident rays that have incident angles with an azimuth component in addition to a polar component (spherical coordinate system). Such rays may be described as having a conical incidence. It is desirable to determine the diffraction efficiency for conical incidence. FIG. 4 shows some parameters used to describe the conical incidence. It shows a pinhole model of the display, of equivalent focal length zf and the virtual display plane, where a pixel i is emphasized. The pixel i has coordinates x and y. The coordinates of the ray sent by that pixel in a spherical coordinate system are:

$$\theta_i = \tan^{-1}\frac{\sqrt{x_i^2 + y_i^2}}{z_f},\ \phi_i = a\tan 2\left(\frac{y_i}{z_f}, \frac{x_i}{z_f}\right)$$

Another way to characterize the ray is by its horizontal and vertical polar angles:

$$\theta_{x_i} = \tan^{-1}\frac{x_i}{z_f},\ \theta_{y_i} = \tan^{-1}\frac{y_i}{z_f}$$

It is the latter that will be found on 2D diffraction efficiency diagrams of FIGS. 6, 7, 12, and 15.

In some embodiments, the overlap angle is experimentally selected with successive simulations to increase the uniformity of the diffraction efficiency as a function of the horizontal and vertical angles. In the following simulations, a TE polarization was used, with the electric field being parallel to grating lines and the light coming from the top. While the simulation uses TE polarization, other embodiments may use TM polarization and even other type of polarizations.

An example cross section of a unit cell of a diffraction grating structure is illustrated in FIG. 5. In the example of FIG. 5, a "U-shaped" diffractive element 502 is provided on a waveguide substrate 504. A plurality of such diffractive elements may be arranged with period d. In some embodiments, the ambient medium is air, with refractive index $n_{air}=1$. In some embodiments, the diffractive element is made of silicon nitride ($Si_3N_4$) with a refractive index of 2.105. In some embodiments, the refractive index of the waveguide substrate is 1.52. As an example, the waveguide substrate may be a glass substrate. In some embodiments, the unit cell has the following dimensions: $d_{pillar}=120$ nm, $h_{pillar}={}^{2}30$ nm, $d_{bridge}={}^{2}60$ nm, $h_{bridge}=55$ nm, d=880 nm. In other embodiments, the unit cell may have different dimensions, and materials with different refractive indices may be used.

Figure 6:
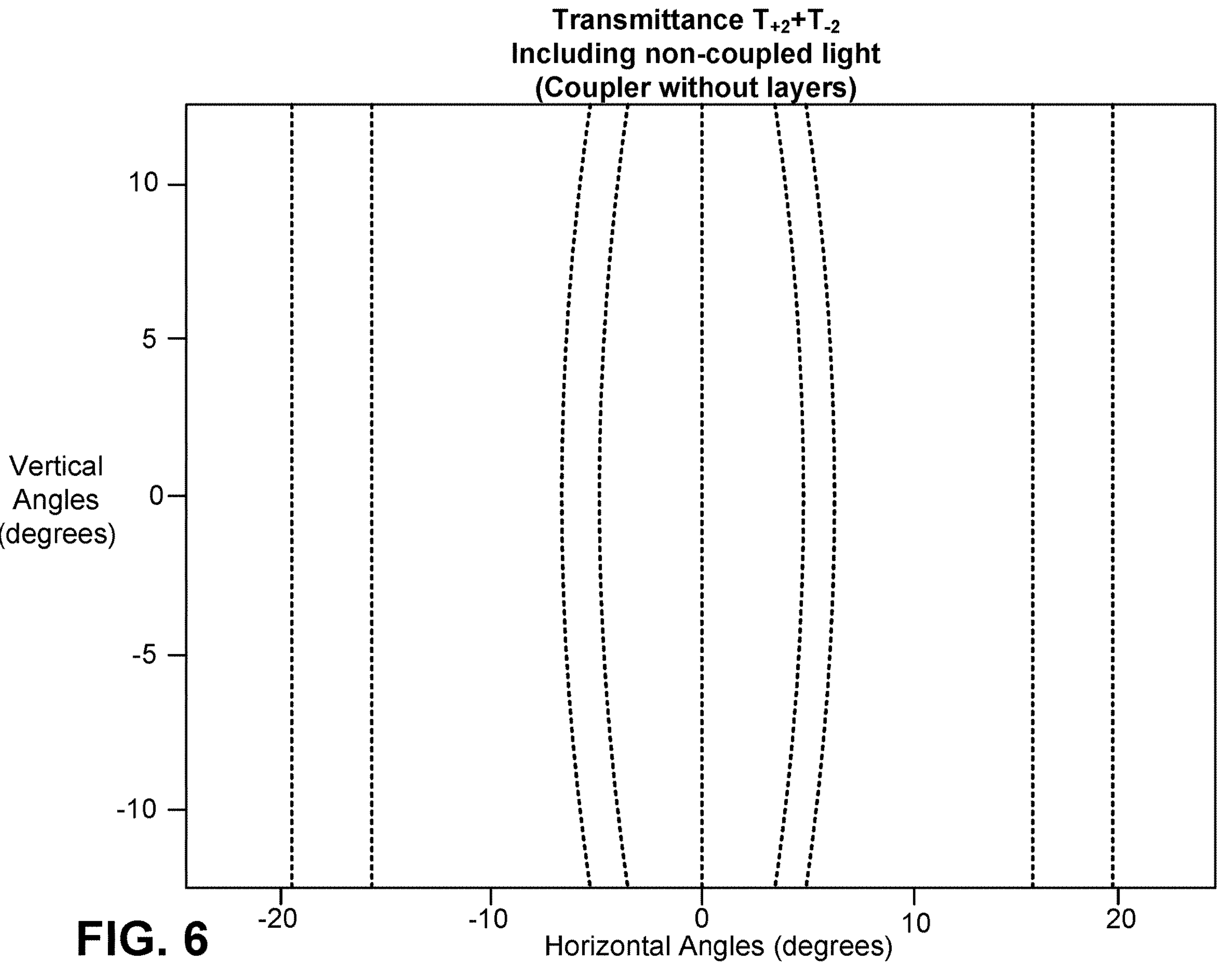
FIG. 6 is a graph that schematically illustrates, for vertical and horizontal angles of incident light, contour lines representing changes in the sum of the transmittance of the +2 and −2 second orders. Greater density of contour lines represents regions with more rapid changes in the sum of the transmittances.

The diffraction efficiencies of a grating structure as shown in FIG. 5 have been calculated with VirtualLab Fusion software for vertical and horizontal angles of incident light. FIG. 6 is a schematic contour diagram illustrating the results, with contour lines illustrating changes in the sum of the transmittance of the +2 and −2 second orders. As represented by the relatively wide spacing between contour lines of FIG. 6, the configuration provides relatively high uniformity. The lowest uniformity value is above 50%.

It is desirable to consider not only whether incident light is diffracted to the +2 and −2 second orders, but also whether that light is diffracted to an angle that is coupled into the waveguide. It is desirable for the rays to be propagating within the range of angles $$[\theta_d^c, \theta_d^g].$$

If the rays have polar directions below the lower bound, they will no longer undergo total internal reflection and will leave the waveguide. If the rays have polar directions above the upper bound, they are above the defined grazing limit and not effectively usable by the rest of the system (such as eye pupil expanders, out-couplers, and the like.

Figure 7:
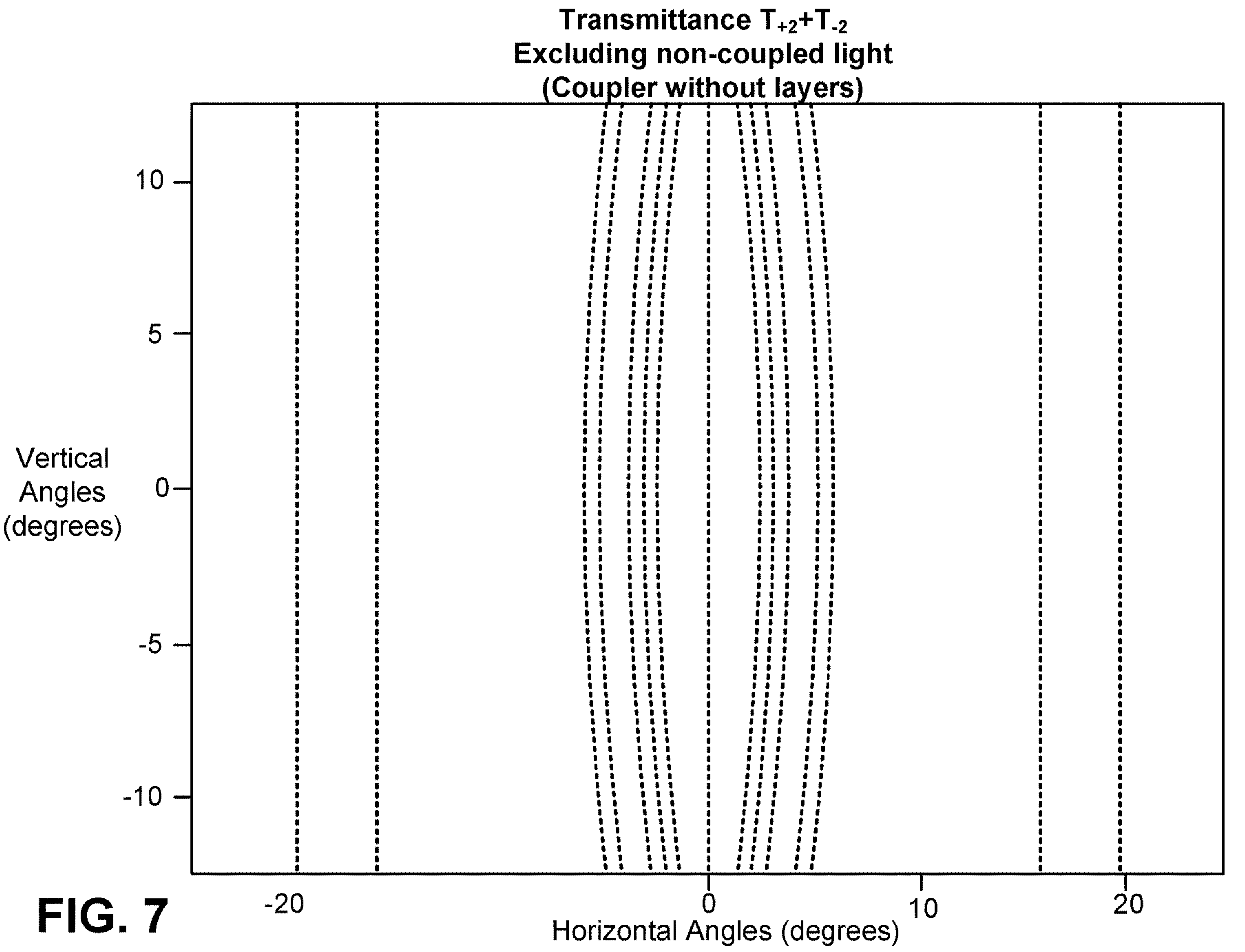
FIG. 7 is a graph that schematically illustrates, for vertical and horizontal angles of incident light, contour lines representing changes in the sum of the transmittance of the +2 and −2 second orders in which the contribution of light that leads to diffracted rays not in the range $$[\theta_d^c, \theta_d^g]$$

FIG. 7 is a schematic contour diagram illustrating the result of removing from FIG. 6 the contribution of diffracted light that does not have an angle that is in-coupled into the waveguide, e.g. is not in the range $$[\theta_d^c, \theta_d^g]$$

after diffraction. As represented by the greater density of contour lines, the uniformity of diffracted light that is coupled into the waveguide (as opposed to merely diffracted to the proper order) has a lower uniformity. The result of removing the non-coupled angular range leads to a minimum diffraction efficiency of 35.7%, a maximum diffraction efficiency of 67.1%, and an overall diffraction uniformity of 69.5%.

While the resulting uniformity is still relatively high, it may be desirable to provide uniformity above 80%. We also see from FIG. 7 that there are two arcs of lower diffraction uniformity where the diffraction efficiency changes dramatically (represented by closely-spaced contour lines). Such dramatic changes are more noticeable to the human eye than other variations that may be spread over a wide spatial area.

FIG. 8A shows the transmittance of the +2 diffraction order and the −2 diffraction order. If these two were added, the result would be a relatively uniform distribution like that shown in FIG. 6. But if we look at one of the curves, the one for M=+2 for instance (the +2 transmitted order, represented by the curve $T_{+2}$), and plot the areas for which the diffracted angles are not within the bounds of critical and grazing limits, then we see that for the angle −5.7°, the ray is at the limit of evanescence (90° of diffraction angle) and then, up to an angle of −2.74°, the diffracted light will be above the grazing angle of 75°. As a result, the portion of the T+2 curve to the left of −2.74° does not represent light that is effectively coupled into the waveguide. Analogously, the portion of the T-2 curve to the right of +2.74° does not represent light that is effectively coupled into the waveguide. The graph of FIG. 8B illustrates the transmittance shown in FIG. 8A, but "filtered" to exclude light that is not effectively coupled into the waveguide. If the two filtered curves of FIG. 8B are added together, in the region between −5.7° and −2.74°, the contribution of the +2 order is missing. On the other hand, the contribution of the −2 order is decreasing very quickly, and this is the origin of some of the non-uniformity.

Example embodiments address the uniformity problem. Some such embodiments address the non-uniformity by providing diffraction efficiency curves in the overlap region with a lower steepness.

Consider the performance of diffraction grating according to some embodiments, using the example of a linearly polarized plane wave incident on the grating from the top in a plane perpendicular to the grating. The angles of the beams diffracted in the far field are not influenced by the structure of the elements. They are determined by the period of the grating, wavelength of the incident plane wave and angle of wave incidence and refraction indexes and can be calculated according to the grating equation. But edge waves diffracted by the vertical edges of the elements of diffraction grating can make a complimentary input into the total response of the periodic array in a case when generated edge waves will have a proper phase and direction. It may be noted that the corresponding characteristics of the edge waves are determined by the ratio between the refractive indexes of the media hosting the element and material of the element of diffraction grating, and the base angle of the element. In some embodiments, the elements may have vertical edges, with base angles that are near or equal to 90°.

In some embodiments, to increase the diffraction uniformity of the diffraction order in-coupled by the waveguide, an additional set of one or more layers is provided between the substrate and the elements of the diffraction grating. Such a multilayered coating may operate as an antireflection coating for the incident plane wave. Such a coating may additionally modify the phase and propagation direction of refracted edge waves, providing higher transmissivity of in-coupled order at low angles of an incidence and improving the diffraction uniformity of in-coupled diffraction orders.

In order to have the diffraction efficiency curve variation in the overlap area varying more smoothly, with less steepness, example embodiments include a number of thin layers between the grating elements (e.g. U-shaped grating elements) of the diffraction grating and the waveguide. The material and thickness of the layers may be selected to vary properly the shape of the curves in the region of the overlap between the positive and negative order. In some embodiments, layers of material such as magnesium fluoride ($MgF_2$), cerium fluoride ($CeF_3$), and/or magnesium fluoride ($MgF_2$) may be provided between the elements of the diffractive in-coupler and the body of the waveguide, as illustrated in FIG. 9. In some embodiments, those layers may be applied using techniques adapted from the application of anti-reflective coatings.

In the embodiment of FIG. 9, an apparatus includes a waveguide comprising a substrate 1004. A plurality of diffractive grating elements 1002 are arranged on the waveguide with a period d. At least two coating layers are provided on the waveguide between the substrate 1002 and the diffractive grating elements 1002. In the example of FIG. 9, the coating layers include a first coating layer 1006, a second coating layer 1008, and a third coating layer 1010. The third coating layer 1010 is in contact with the substrate 1004, and the second coating layer 1008 is between the first coating layer and the third coating layer.

In some embodiments, the first coating layer has a first refractive index lower than a substrate refractive index of the substrate. For example, the first coating layer may be magnesium fluoride ($MgF_2$) with a refractive index $n_{L1}$ of 1.377, and the substrate may have a refractive index $n_{WG}$ of 1.52.

In some embodiments, the second coating layer has a second refractive index higher than the substrate refractive index. For example, the second coating layer may be cerium fluoride ($CeF_3$) with a refractive index $n_{L2}$ of 1.627.

In some embodiments, the third coating layer may have a third refractive index lower than the substrate refractive index. For example, the third coating layer may be magnesium fluoride ($MgF_2$) with a refractive index $n_{L3}$ of 1.377.

In some embodiments, at least one of the coating layers has a thickness greater than 40 nm. For example, in one embodiment, the first layer has a thickness of $h_{L1}$ of 180 nm, the second layer has a thickness $h_{L2}$ of 80 nm, and the third layer has a thickness $h_{L3}$ of 90 nm. In some embodiments, each of the layers has a thickness less than 200 nm.

In some embodiments, the unit cell has the following dimensions: $d_{pillar}$=120 nm, $h_{pillar}={}^{2}30$ nm, $d_{bridge}$=260 nm, $h_{bridge}$=55 nm, d=880 nm. In other embodiments, the unit cell may have different dimensions, and materials with different refractive indices may be used.

FIG. 16 is a partial cutaway schematic perspective view of the embodiment of FIG. 9.

The specific dimensions and refractive indices provided for this and other examples in this document are those of embodiments used in the described simulations. In other embodiments, the dimensions and indices may vary from those described. For example, in some embodiments, the dimensions and refractive indices may be within 10% of those expressly described. In some embodiments, the dimensions and refractive indices may be within 25% of those expressly described. In some embodiments, the dimensions and refractive indices may be within 50% of those expressly described.

As seen from simulations of diffractive structures that do not use additional layers between the substrate and the diffractive elements, the curves in the overlap region in the original system, without the thin layers, lead to lower uniformity because of rapid changes in both the $T_{-2}$ and $T_{+2}$ curves of FIG. 8B in the vicinity of +/−2.74°.

Simulations have found that embodiments using thin layers, as shown in FIG. 9, have a different variation. In such embodiments, the addition of both diffraction orders leads to a relatively smooth variation of the diffraction efficiency over that region of overlap.

Example embodiments allow fine control of conical diffraction uniformity with a combination of multiple layers. In one embodiment those layers use anti-reflection coating materials, which may be applied according to known fabrication processes.

In an example system configured according to FIG. 9, the in-plane curves exhibit desirable behavior, dropping or rising with approximately a constant rate, as shown in the graph of FIG. 10.

The result is that when we add the order +2 and −2 and exclude all non-coupled rays that are not diffracted between the critical and grazing angle, the result is a smoother variation of the over-all diffraction efficiency map, as shown in FIGS. 11A-11B.

FIG. 11A illustrates transmittance of the bare waveguide with the u-shaped diffractive elements as in FIG. 5, with no additional layers between the diffractive elements and the body of the waveguide. The solid curve is the result of the addition for both diffraction orders after excluding light that is diffracted to the desired order (+2 or −2 in this case) but that has an angular range that is not coupled into the waveguide. The dotted segments illustrate what the result would have been without excluding non-coupled light. There is a decrease in coupled light for incident angles around +/−25-30° because the diffracted light has an angle below the critical angle $\theta_{TIR}$ and thus does not propagate in the waveguide by total internal reflection. There is a decrease in coupled light for incident angles around +/−2-5° because the diffracted light has an angle greater than the grazing angle (e.g. 75°).

FIG. 11B illustrates the transmittance for the system with three layers between the u-shaped diffractive elements and the body of the waveguide as shown in FIG. 9. The solid curve is the result of the addition for both diffraction orders after excluding light having an angular range that is not coupled into the waveguide. The dotted segments illustrate what the result would have been without excluding non-coupled light. There is a decrease in coupled light for incident angles around +/−25-30° because the diffracted light has an angle below the critical angle $\theta_{TIR}$ and thus does not propagate in the waveguide by total internal reflection. There is a decrease in coupled light for incident angles around +/−2-5° because the diffracted light has an angle greater than the grazing angle (e.g. 75°). With the use of layers as shown in FIG. 9, the uniformity of the coupled light (as seen in FIG. 11B) is much greater than the uniformity that arises without the use of layers (as seen in FIG. 11A), as may be seen by comparing the minimal and maximal diffraction efficiencies.

Simulations have been performed to compare uniformity of coupled light that consider not just the horizontal angle of incidence (as illustrated in FIGS. 11A-11B) but also the vertical angle of incidence, referred to as the case of conical incidence. FIG. 12 represents the results of the simulations, in which the uniformity is greater than that seen without the use of thin layers, represented by the greater spacing of contour lines in FIG. 12 as compared to FIG. 7. Simulations for the use of thin layers as in FIG. 9 show a minimal diffraction efficiency of 50.7%, maximal diffraction efficiency of 69.6%, a diffraction uniformity of 84.3%, and an average diffraction efficiency of 59.4% within a normal operating range. The diffraction uniformity of 84.3% achieved with the use of thin layers as in FIG. 9 compares favorably to the diffraction uniformity achieved without thin layers where the uniformity in the case of conical incidence was only 69.5%.

In some embodiments, the diffractive elements are silicon elements. In some embodiments, the diffractive elements are silicon nitride. The properties of the layers below the diffractive elements may be selected by taking into account the refractive index of the waveguide. Through simulations it has been determined that to improve the diffraction uniformity, it is desirable for the substrate coating to include the layers with the refractive index above and below the refractive index of the waveguide. For example, in some embodiments using a 3-layer coating, the refractive index of the first and third layers is below the refractive index of the substrate/waveguide and the refractive index of the central second layer is above the refractive index of the substrate/waveguide. In some embodiments, three layers are provided over a sapphire substrate, with the first layer and the third layer being magnesium fluoride ($MgF_2$) and the second layer being zirconium dioxide ($ZrO_2$) materials. In order to improve the uniformity for the low polar angles $\theta_i$, some embodiments also include a fourth layer, which may be titanium dioxide $TiO_2$, above the first layer of $MgF_2$ or between the first layer of $MgF_2$ and second layer of $ZrO_2$.

Some embodiments exhibit increased uniformity using a grating composed of a non-dielectric material, such as silicon. Some such embodiments use a twin shape for diffractive elements. For example, the diffractive structure may include two silicon pillars in each unit cell of the diffractive in-coupler. In some such embodiments, to achieve high uniformity, a fourth thin layer of Titanium Dioxide ($TiO_2$) is included along with layers of $MgF_2$, and $ZrO_2$. One such configuration is illustrated in FIG. 13. In some such embodiments, the structure has a pitch of 764 nm, an overlap angle of −4°, and it may be used to diffract the second orders.

In the embodiment of FIG. 13, an apparatus includes a waveguide comprising a substrate 1404. A plurality of diffractive grating elements are arranged on the waveguide with a period d. In the embodiment of FIG. 13, each grating element is a pair of grating lines 1402*a* and 1402*b*. The grating element may be made of silicon, with a refractive index of 3.8954+i0.22. In some embodiments, the unit cell has the following dimensions: $d_{pillar}$=80 nm, $h_{pillar}$=110 nm, $d_{bridge}$=294 nm, d=880 nm. In other embodiments, the unit cell may have different dimensions, and materials with different refractive indices may be used.

At least two coating layers are provided on the waveguide between the substrate 1404 and the diffractive grating elements 1402*a,b*. In the example of FIG. 13, the coating layers include a first coating layer 1406, a second coating layer 1408, and a third coating layer 1410. The third coating layer 1410 is in contact with the substrate 1404, and the second coating layer 1408 is between the first coating layer and the third coating layer.

In some embodiments, the first coating layer has a first refractive index lower than a substrate refractive index of the substrate. For example, the first coating layer may be magnesium fluoride ($MgF_2$) with a refractive index $n_{L1}$ of 1.377, and the substrate may be, for example, sapphire with a refractive index $n_{WG}$ of 1.7663.

In some embodiments, the second coating layer has a second refractive index higher than the substrate refractive index. For example, the second coating layer may be zirconium dioxide ($ZrO_2$) with a refractive index $n_{L2}$ of 2.1528.

In some embodiments, the third coating layer may have a third refractive index lower than the substrate refractive index. For example, the third coating layer may be magnesium fluoride ($MgF_2$) with a refractive index $n_{L3}$ of 1.377.

In some embodiments, at least one of the coating layers has a thickness greater than 40 nm. For example, in one embodiment, the first layer has a thickness of $h_{L1}$ of 50 nm, the second layer has a thickness $h_{L2}$ of 50 nm, and the third layer has a thickness $h_{L3}$ of 65 nm. In some embodiments, each of the layers has a thickness less than 200 nm.

In the embodiment of FIG. 13, a phase-modifying layer 1412 is provided between the first and second coating layers. The phase-modifying layer may have a thickness of, for example, 5-10 nm and a refractive index greater than the second refractive index. In some embodiments, the phase-modifying layer may be titanium dioxide ($TiO_2$) with a refractive index of 2.392.

In alternative embodiments, a phase-modifying layer is positioned between the grating elements and the first coating layer (above layer 1406). The phase-modifying layer may have a thickness of, for example, 5-10 nm and a refractive index greater than the second refractive index. In some embodiments, the phase-modifying layer may be titanium dioxide ($TiO_2$) with a refractive index of 2.392.

The specific dimensions and refractive indices provided for this and other examples in this document are those of embodiments used in the described simulations. In other embodiments, the dimensions and indices may vary from those described. For example, in some embodiments, the dimensions and refractive indices may be within 10% of those expressly described. In some embodiments, the dimensions and refractive indices may be within 25% of those expressly described. In some embodiments, the dimensions and refractive indices may be within 50% of those expressly described.

FIG. 17 is a partial cutaway schematic perspective view of the embodiment of FIG. 13.

FIG. 14 is a graph of transmittance and reflectance for the embodiment of FIG. 13. The graph illustrates smooth and non-steep transitions in the overlap area, specifically in the region ±8°, as a result of the added thin film layers. FIG. 15 represents the results of the simulations shown in two dimensions, in which the uniformity is greater than that seen without the use of thin layers, represented by the greater spacing of contour lines in FIG. 15 as compared to FIG. 7. In simulations, the embodiment of FIG. 13 demonstrates a minimum diffraction efficiency of 56.2%, a maximum diffraction efficiency of 84.8%, a diffraction uniformity of 79.7%, and an average diffraction efficiency of 73.3%.

In some embodiments, for positive diffraction order, $$\theta_i^g$$

is negative with $$|\theta_i^g| > 0.$$

To meet this condition, the pitch of the diffraction grating may be selected to be greater than $$\Lambda'_M,$$

where $$\Lambda'_M = \frac{M\lambda}{n_d \sin\theta_d^g}$$

and $$\theta_d^g < 75 \text{ deg.}$$

Increasing $$|\theta_i^g|$$

may improve the diffraction uniformity of the grating response.

Example embodiments smooth the 2D diffraction efficiency for angles of incident light in a conical range. In some embodiments, the diffraction efficiency is improved by increasing the overlap angle, allowing for adding of diffraction efficiencies of the positive and negative diffraction orders. The amount of overlap may be selected based at least in part on the material of the substrate (e.g. glass or sapphire). The amount of overlap may be selected based at least in part on the material of the element and corresponding desirable level of minimal and maximal transmittivity.

FIG. 18 illustrates a method performed in some embodiments. The method includes, at 1802, applying at least two coating layers on a surface of a waveguide substrate. At least one of the coating layers may have a thickness greater than 40 nm. Various different arrangements of layers may be used, such as the arrangement 1804 of layers as illustrated in FIG. 9, or the arrangement 1806 of layers as illustrated in FIG. 13, among other possible arrangements of layers. The applied layers may have any of the materials, thicknesses, and refractive indices as described herein, among others.

In the method, at 1808, a plurality of diffractive grating elements are applied on the surface of the waveguide substrate over the coating layers. The diffractive grating elements may have a U-shaped cross section 1002 as illustrated in FIG. 9, a double-rectangle cross section as illustrated in FIG. 13, a single-rectangle cross-section, or another configuration. The grating elements may have any of the materials, dimensions, periods, and refractive indices as described herein, among others.

In some embodiments, a plurality of layers (e.g. two or more layers) are provided between the waveguide body and the diffractive elements to smooth the transition regions of overlap.

In some embodiments, the substrate coating includes layers with the refractive index above and below the refractive index of the waveguide.

In some embodiments, a phase-modifying layer with high refractive index is provided along with the coating layers.

In some embodiments, the layers added on top of the waveguide may be applied only to the in-coupler region of the waveguide. In some embodiments, the layers may be added to the entire waveguide. In some embodiments, the thicknesses of the layers in the stack are selected such that the layers act as an anti-reflection coating. In some embodiments, the layer thicknesses are selected to provide benefits of both diffraction uniformity and an anti-reflective property, for example with three layers acting as an anti-reflection coating. As an example, in an embodiment in which the layers have thicknesses of 160 nm, 60 nm and 90 nm respectively instead of 180 nm, 80 nm, and 90 nm, the reflectance at the red wavelength (the red 625 nm is used in all the previous figures) drops to 0.5% instead of 4.2%.

ADDITIONAL EMBODIMENTS

An apparatus according to some embodiments includes a waveguide comprising a substrate, a plurality of diffractive grating elements on the waveguide, and at least two coating layers on the waveguide between the substrate and the diffractive grating elements.

In some such embodiments, the coating layers comprise a first coating layer, a second coating layer, and a third coating layer, the third coating layer being in contact with the substrate, and the second coating layer being between the first coating layer and the third coating layer.

In some embodiments, the substrate has a substrate refractive index, the first coating layer has a first refractive index lower than the substrate refractive index, the second coating layer has a second refractive index higher than the substrate refractive index, and the third coating layer has a third refractive index lower than the substrate refractive index. In some such embodiments, the first refractive index and the third refractive index are the same.

In some embodiments, the apparatus further includes a fourth coating layer, wherein the fourth coating layer has a fourth refractive index greater than the second refractive index. The fourth coating layer may be between the first coating layer and the diffractive grating elements. Alternatively, the fourth coating layer may be between the first coating layer and the second coating layer.

In some embodiments, all of the coating layers have a thickness less than 200 nm.

In some embodiments, all of the coating layers have a thickness less than λ/2, where λ is a wavelength of incident light.

In some embodiments, the diffractive grating elements are elements of a diffractive in-coupler.

In some embodiments, the diffractive in-coupler is a dual-mode in-coupler.

In some embodiments, the dual-mode in-coupler has a negative overlap angle $$(\theta_i^g).$$

The overlap angle may satisfy $$\theta_i^g \leq -4°.$$

The overlap angle may satisfy $$\theta_i^g < 0°.$$

The overlap angle may satisfy $$\theta_i^g \leq -5°.$$

In some embodiments, the in-coupler may have a diffraction uniformity of greater than 50%.

A method according to some embodiments includes applying at least two coating layers on a surface of a waveguide substrate and applying a plurality of diffractive grating elements on the surface of the waveguide substrate over the coating layers.

In some embodiments, the coating layers comprise a first coating layer, a second coating layer, and a third coating layer, the third coating layer being in contact with the substrate, and the second coating layer being between the first coating layer and the third coating layer.

In some embodiments, the substrate has a substrate refractive index, the first coating layer has a first refractive index lower than the substrate refractive index, the second coating layer has a second refractive index higher than the substrate refractive index; and the third coating layer has a third refractive index lower than the substrate refractive index. In some embodiments, the first refractive index and the third refractive index are the same.

Some embodiments further include a fourth coating layer, wherein the fourth coating layer has a fourth refractive index greater than the second refractive index. The fourth coating layer may be between the first coating layer and the diffractive grating elements. Alternatively, the fourth coating layer may be between the first coating layer and the second coating layer.

In some embodiments, all of the coating layers have a thickness less than 200 nm.

Although features and elements are described above in particular combinations, one of ordinary skill in the art will appreciate that each feature or element can be used alone or in any combination with the other features and elements.

What is claimed:

1. An apparatus comprising:

a waveguide comprising a substrate having a substrate refractive index;

at least three coating layers on the waveguide over the substrate, the coating layers comprising a first coating layer, a second coating layer, and a third coating layer, the third coating layer being in contact with the substrate, and the second coating layer being between the first coating layer and the third coating layer, wherein:

the first coating layer has a first refractive index lower than the substrate refractive index;

the second coating layer has a second refractive index higher than the substrate refractive index; and the third coating layer has a third refractive index lower than the substrate refractive index;

at least one phase-modifying layer at least between the grating elements and the first coating layer or between the first and second coating layers, the phase-modifying layer having a thickness of 5-10 nm and a refractive index greater than the second refractive index, the at least one phase-modifying layer having a thickness of 5-10 nm and a refractive index greater than the second refractive index; and a plurality of diffractive grating elements over the coating layers.

2. The apparatus of claim 1, wherein at least one of the coating layers has a thickness greater than 40 nm.

3. The apparatus of claim 2, wherein the first, second, and third coating layers each have a thickness greater than 40 nm.

4. The apparatus of claim 1, wherein each of the first, the second, and the third coating layers has a thickness less than 200 nm.

5. The apparatus of claim 1, wherein the diffractive grating elements are elements of a dual-mode diffractive in-coupler.

6. The apparatus of claim 1, having at least three coating layers on the waveguide between the substrate and the diffractive grating elements.

7. The apparatus of claim 1, further comprising an image generator configured to direct light representing an image on the diffractive grating elements, wherein the diffractive grating elements are configured to couple the image into the waveguide.

8. The apparatus of claim 1, wherein each of the first, the second, and the third coating layers has a thickness greater than 40 nm and less than 200 nm.

9. A method comprising:

applying at least three coating layers over a surface of a waveguide substrate having a substrate refractive index;

wherein:

the coating layers comprise a first coating layer, a second coating layer, and a third coating layer, the third coating layer being in contact with the substrate, and the second coating layer being between the first coating layer and the third coating layer, and the first coating layer has a first refractive index lower than the substrate refractive index, the second coating layer has a second refractive index higher than the substrate refractive index, and the third coating layer has a third refractive index lower than the substrate refractive index;

applying at least one phase-modifying layer at least between the grating elements and the first coating layer or between the first and second coating layers, the phase-modifying layer having a thickness of 5-10 nm and a refractive index greater than the second refractive index, the at least one phase-modifying layer having a thickness of 5-10 nm and a refractive index greater than the second refractive index; and applying a plurality of diffractive grating elements over the coating layers.

10. The method of claim 9, wherein at least one of the coating layers has a thickness greater than 40 nm.

11. The method of claim 9, wherein the first refractive index and the third refractive index are the same.

12. The method of claim 9, wherein the coating layers further comprise a fourth coating layer, the fourth coating layer having a fourth refractive index greater than the second refractive index.

13. The method of claim 12, wherein the fourth coating layer is between the first coating layer and the diffractive grating elements.

14. The method of claim 12, wherein the fourth coating layer is between the first coating layer and the second coating layer.

15. The method of claim 9, wherein each of the first, the second, and the third coating layers has a thickness less than 200 nm.

16. The method of claim 9, wherein each of the first, the second, and the third coating layers has a thickness greater than 40 nm and less than 200 nm.

* * * * *